(12) United States Patent
Yamamiya

(10) Patent No.: US 9,708,125 B2
(45) Date of Patent: Jul. 18, 2017

(54) CARD PROCESSING APPARATUS

(71) Applicant: Asahi Seiko Co., Ltd., Tokyo (JP)

(72) Inventor: Takahito Yamamiya, Saitama (JP)

(73) Assignee: ASAHI SEIKO CO., LTD. (JP)

( * ) Notice: Subject to any disclaimer, the term of this patent is extended or adjusted under 35 U.S.C. 154(b) by 0 days.

(21) Appl. No.: 14/965,315

(22) Filed: Dec. 10, 2015

(65) Prior Publication Data

US 2016/0167883 A1    Jun. 16, 2016

(30) Foreign Application Priority Data

Dec. 12, 2014 (JP) ................................. 2014-252491

(51) Int. Cl.
| | |
|---|---|
| *B65H 7/20* | (2006.01) |
| *B65G 13/071* | (2006.01) |
| *G06K 13/067* | (2006.01) |
| *G06K 13/08* | (2006.01) |
| *B65H 7/00* | (2006.01) |

(52) U.S. Cl.
CPC ......... *B65G 13/071* (2013.01); *G06K 13/067* (2013.01); *G06K 13/08* (2013.01); *B65H 7/00* (2013.01)

(58) Field of Classification Search
CPC ............... B65H 7/00; B65H 7/02; B65H 7/20
USPC ............... 271/265.01, 258.01, 259; 198/437, 198/460.1, 571, 572
See application file for complete search history.

(56) References Cited

U.S. PATENT DOCUMENTS 4,659,082 A  * 4/1987 Greenberg ................ A63F 1/12
                                                         273/149 R
6,267,619 B1 * 7/2001 Nishioka ............... G06K 7/0069
                                                         439/489
(Continued)

FOREIGN PATENT DOCUMENTS

| EP | 1455301 | 9/2004 |
| EP | 1808834 | 7/2007 |

(Continued)

OTHER PUBLICATIONS

Extended European Search Report dated Mar. 3, 2016 for Corresponding European Patent Application EP15196434.3 (6 pages).

(Continued)

*Primary Examiner* — Leslie A Nicholson, III
*Assistant Examiner* — Lester Rushin

(57) ABSTRACT

A card processing apparatus detects an insertion/non-insertion of a card and a position of an inserted card regardless of any existence/non-existence of an opaque part on any position of the card. A first card detector is disposed at a first position in a conveying path, a second card detector is disposed at a second position after the first card detector, and a third card detector is disposed at a third position in the conveying path. A conveying mechanism is controlled by detection signals outputted from the first to third card detectors. Each of the card detectors include an operating member movable from a standby position to a shifted position due to contact with the card. A sensor detects any displacement of the operating member, wherein one of the detection signals provides a detection/non-detection of a card, an insertion or non-insertion of a card and an inserted card position.

18 Claims, 26 Drawing Sheets

(56) References Cited

U.S. PATENT DOCUMENTS

| | | | | |
|---|---|---|---|---|
| 6,851,613 B2* | 2/2005 | Yoshii | ............... | G06K 13/06 |
| | | | | 235/475 |
| 8,042,732 B2* | 10/2011 | Blake | ............... | G07D 9/008 |
| | | | | 235/375 |
| 2003/0075607 A1* | 4/2003 | Hopt | ............... | G06K 13/08 |
| | | | | 235/475 |
| 2013/0241143 A1* | 9/2013 | Nireki | ............... | B65H 7/02 |
| | | | | 271/265.01 |

FOREIGN PATENT DOCUMENTS

| | | |
|---|---|---|
| JP | 2005-173947 | 6/2005 |
| JP | 2009199272 | 9/2009 |
| JP | 2010-160666 | 7/2010 |
| JP | 2011-113209 | 6/2011 |
| JP | 4888789 | 12/2011 |
| WO | WO2014/155892 | 10/2014 |

OTHER PUBLICATIONS

Office Action issued Apr. 28, 2016 in corresponding Korea patent application No. 10-2015-0166083 (5 pages).

Office Action issued Mar. 7, 2017 in corresponding Japanese Patent Application No. 2014-252491 with Brief English Language Translation of the Examiner's Comments (5 pages).

\* cited by examiner

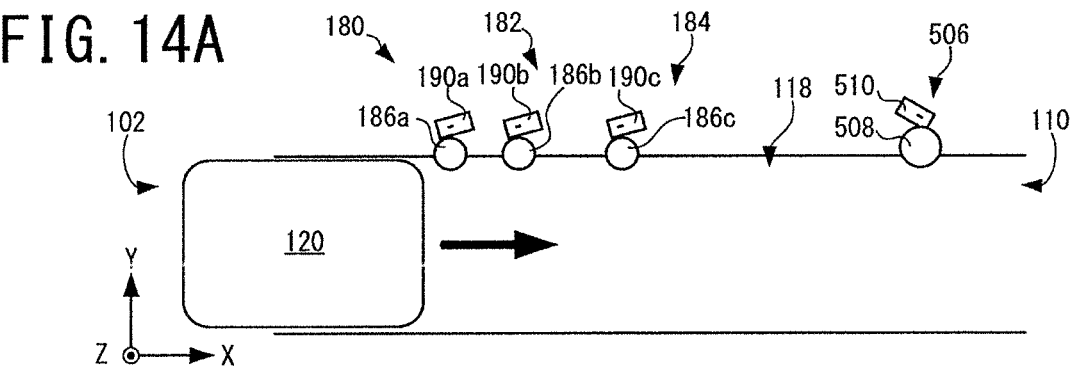
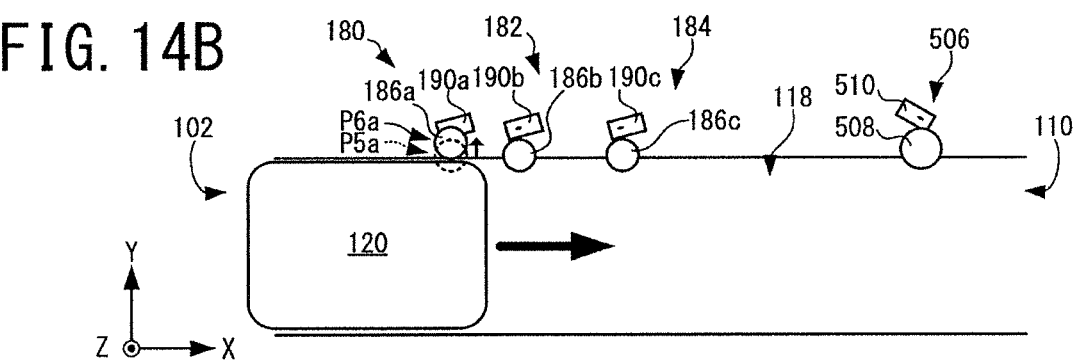
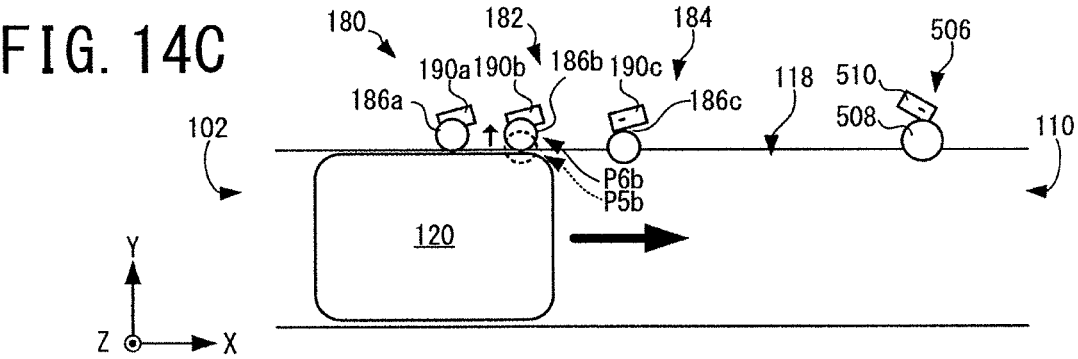
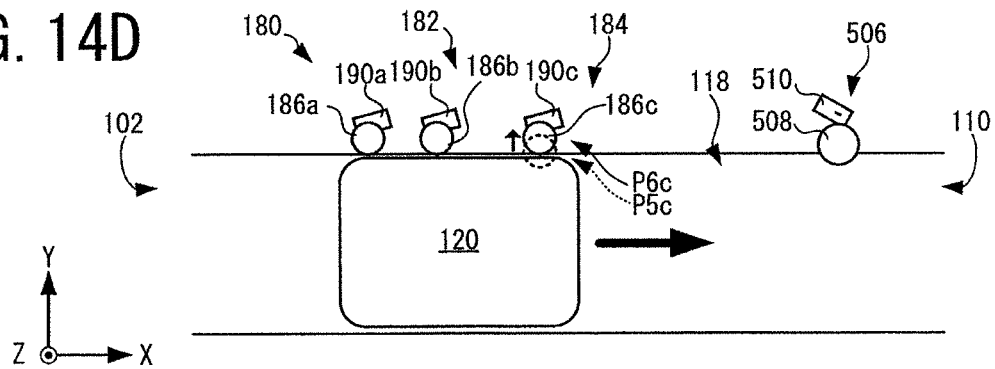

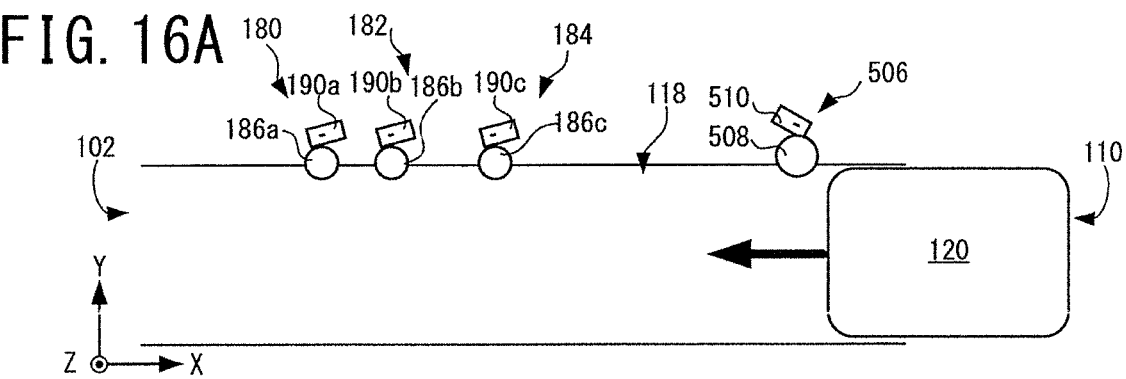
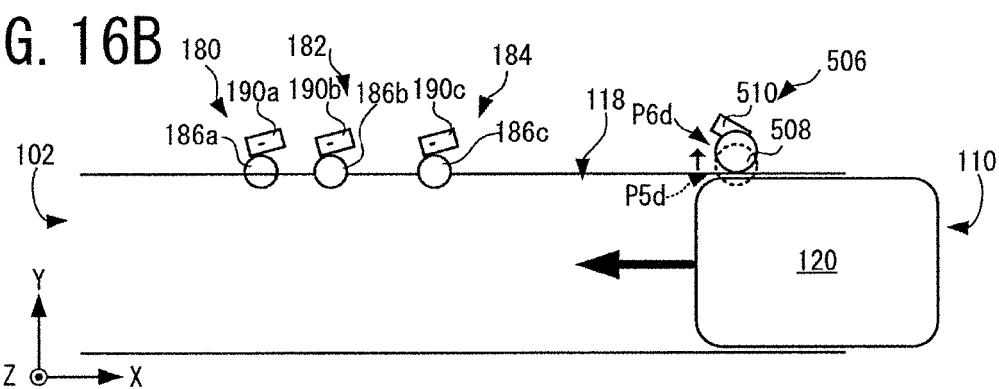
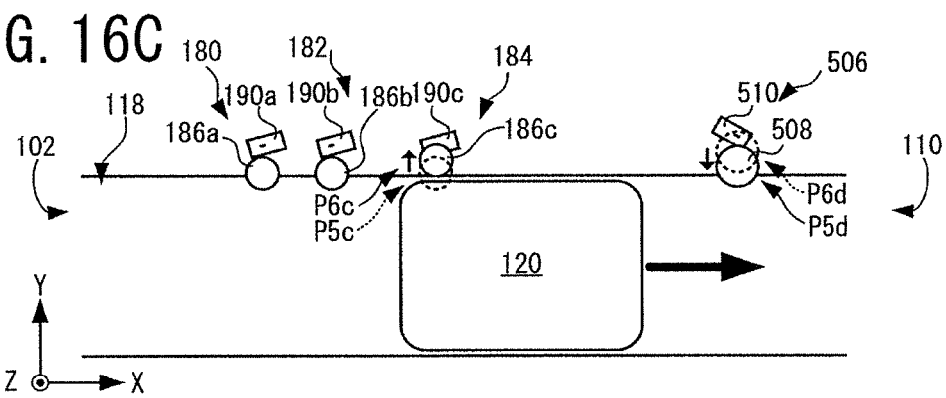
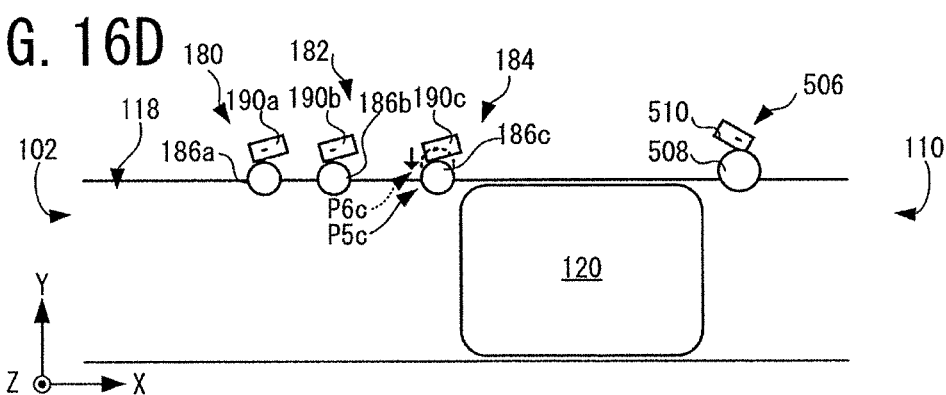

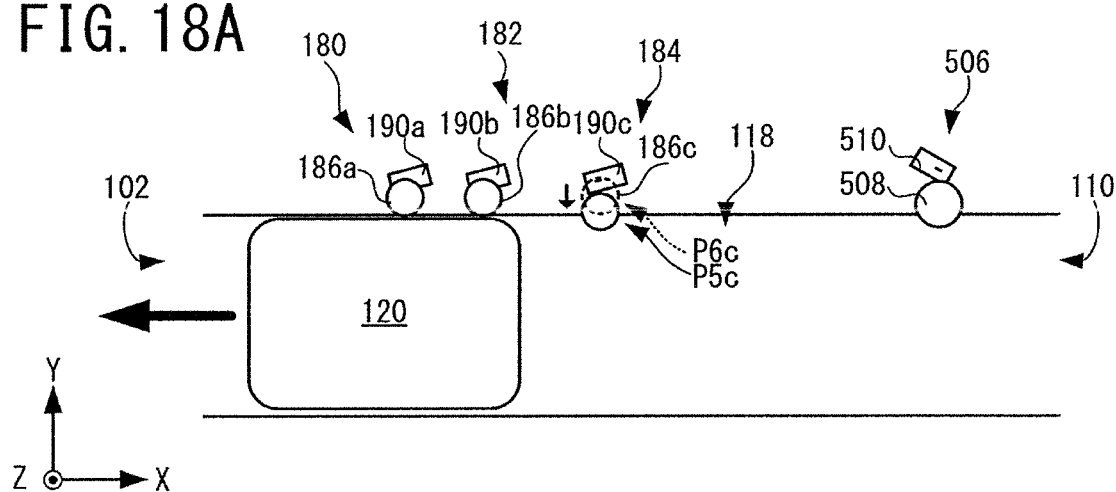
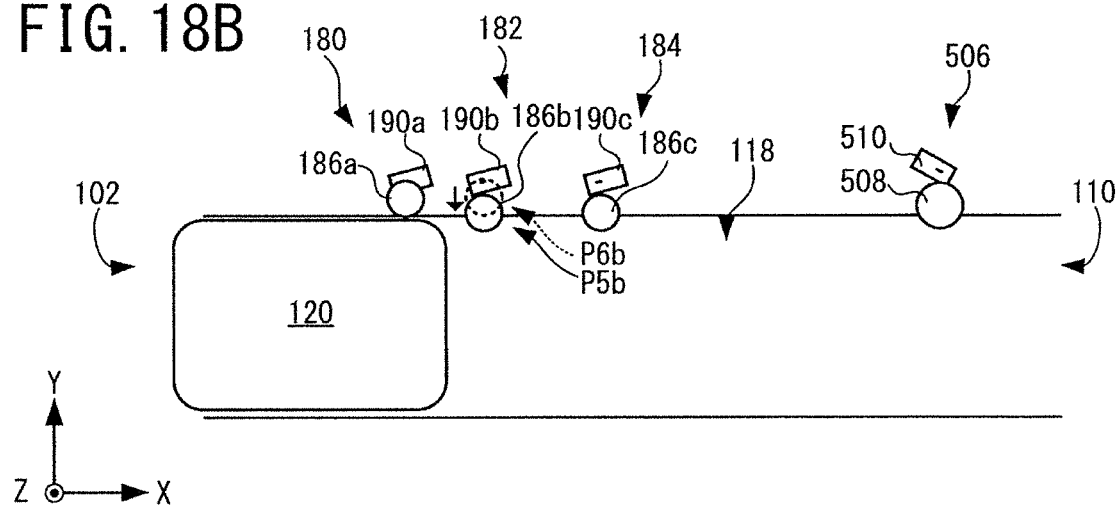

CARD PROCESSING APPARATUS

BACKGROUND OF THE INVENTION

1. Field of the Invention

The present invention relates to a card processing apparatus and more particularly, to a card processing apparatus capable of introducing a card into its inside to perform predetermined processes, such as reading information from the card. In particular, it is preferred that this apparatus is applied to the processes of cards having transparency.

The present invention is applicable to a variety of card processing apparatuses having the function of introducing a card into its inside and the function of ejecting a card from its inside to its outside, such as Automated Teller Machines (ATM), vending machines, card vending machines, and card charging machines.

The term "card" used in this specification widely means a card-shaped article, which includes not only card-shaped information storage media with transparency (i.e., information storage medium cards) but also cards and card-shaped articles without transparency and/or information storage function. Concretely speaking, the term "card" includes telephone cards, prepaid cards, character cards, portrait photographs, amusement cards, magnetic-stripe cards (e.g., credit cards and bank cards), IC cards, bar-coded cards, and other thin plate-shaped articles made of paper, plastic or the like that are equivalent to or larger than these cards in thickness.

2. Description of the Related Art

As the first prior art apparatus relating to the present invention, a card handling apparatus disclosed in Japanese Non-Examined Patent Publication No. 2005-173947 published in 2005 is known (see FIG. 3, claim 1, and Paragraphs 0009, 0014 to 0016, and 0023 to 0024). This prior art card handling apparatus comprises a card insertion hole for receiving a card inserted which has an information storage part; card conveying means for conveying the card inserted into the card insertion hole; card information reading means for reading information stored in the information storage part of the card conveyed by the card conveying means; and card reading position detecting means for detecting conveyance of the card to a position at which the card information reading means reads the information in the card. The card reading position detecting means is located on the path of the information storage part of the card when the card is conveyed by the card conveying means and at the same time, it is located before and/or behind the card information reading means in the card conveying direction of the card conveying means.

Concretely speaking, with this prior art card handling apparatus, all of the sensors serving as the card reading position detecting means, that is, an optical sensor for detecting the insertion of the card (first sensor), an optical sensor for detecting the position of the card (second sensor), an optical sensor for measuring the information reading timing which is placed before (on the upstream side of) the magnetic head for information reading (third sensor), and an optical sensor for measuring the information reading timing which is placed behind (on the downstream side of) the magnetic head (fourth sensor), are arranged on the path of the information storage part (e.g., the magnetic stripe) of the card which is conveyed by the card conveying means. Due to such a configuration, the information storage part of the card is surely detected by the aforementioned optical sensors during conveyance; therefore, even a card that is made transparent excluding the information storage part (a so-called skeleton card) can be surely detected.

As the second prior art apparatus relating to the present invention, a card processing apparatus disclosed in Japanese Patent No. 4888789 issued in 2011 is known (see FIGS. 2 and 4, claim 1, and Paragraphs 0023, 0034 to 0043, and 0048 to 0072). This prior art card processing apparatus comprises an optical sensor for detecting card insertion which is provided at a card insertion hole of a card conveying path; an optical sensor for detecting a card length which is provided on the downstream side of a card inserting direction at a predetermined interval from the sensor for detecting card insertion; a card conveying mechanism for feeding the card placed in the card conveying path; and a conveyance controller for controlling the operating condition of the card conveying mechanism based on the signals from the sensor for card insertion detection and the sensor for card length detection.

On the conveying path between the sensor for card insertion detection and the sensor for card length detection, a sensor for detecting existence of a card regardless of whether the card is transparent or opaque is provided. The conveyance controller comprises card feed control means for driving the card conveying mechanism in the card insertion direction in response to a card detection signal from the sensor for card insertion detection; length judgment means for judging whether or not the length of an opaque part of a card reaches a predetermined length based on a signal from the sensor for card insertion detection and a signal from the sensor for card length detection; and card returning action regulating means for regulating an action of returning a card. When it is judged by the length judgment means that the length of the opaque part of the card reaches the predetermined length, the card returning action regulating means keeps a card feed by the card conveying mechanism. On the other hand, when it is judged by the length judgment means that the length of the opaque part of the card does not reach the predetermined length, it is further judged whether or not a card is detected by the sensor for card existence detection and then, if it is judged that a card is detected, the card returning action regulating means drives the card conveying mechanism in the card ejecting direction to thereby eject the card through the card insertion hole, and returns the card conveying mechanism to its initial state. If it is judged that a card is not detected, the card returning action regulating means returns the card conveying mechanism to its initial state immediately.

With the aforementioned card processing apparatus as the second prior art, the sensor for card existence detection is placed on the conveying path between the sensor for card insertion detection and the sensor for card length detection (all of which are optical sensors), thereby making it possible to judge the existence or non-existence of a card regardless of whether the card is transparent or opaque. Moreover, only when a card is detected, the card conveying mechanism is driven by the card returning action regulating means in the card ejecting direction, thereby ejecting the card through the card insertion hole; when a card is not detected, the card conveying mechanism is immediately returned to its initial state by the card returning action regulating means, thereby preparing the insertion of a next card. For this reason, when a card with a transparent part and an opaque part is processed in this prior-art card processing apparatus, the existence or non-existence of the card can be found by the sensor for card existence detection in the state where the opaque part of the card that is being conveyed is placed on the conveying path between the sensor for card insertion detection and the sensor for card length detection. Therefore, even in the state where the card is unable to be detected by any of the sensor for card insertion detection and the sensor for card length detection, a meaningless card returning process can be surely prevented, which raises the operation efficiency of this card processing apparatus.

With the aforementioned card handling apparatus as the first prior art, however, if a skeleton card is inserted into the card insertion hole in an erroneous state or attitude, there is a problem that the card thus inserted is unable to be handled normally in this apparatus.

For example, when a skeleton card is inserted into the card insertion hole in such a way that its surface and back are inverted or its front and rear are inverted, or when a skeleton card which is wholly transparent and which has no information storage part is inserted into the card insertion hole, information reading from the card thus inserted and/or information writing into the card is/are unable to be carried out. This is because the information storage part of the skeleton card thus inserted is unable to be detected by any of the first to fourth optical sensors serving as the card reading position detecting means. Accordingly, there arises a problem that the inserted card is unable to be handled normally in this prior-art card handling apparatus, which means that a predetermined card ejecting operation of ejecting the inserted card from the apparatus through the card insertion hole needs to start immediately while judging this state an "error".

Moreover, with the aforementioned card processing apparatus as the second prior art, the existence or non-existence of a card can be detected by the sensor for card existence detection located on the conveying path between the sensor for card insertion detection and the sensor for card length detection regardless of whether the card is a skeleton card or not. However, both of the sensor for card insertion detection and the sensor for card length detection are formed by optical sensors. Thus, these two sensors are located at the positions where the opaque information storage part of a skeleton card which is inserted through the card insertion hole can be detected. For this reason, when a skeleton card is inserted into the card insertion hole in such a way that its surface and back are inverted or its front and rear are inverted, or when a skeleton card which is wholly transparent and which has no information storage part is inserted into the card insertion hole, there arises a problem that the insertion or non-insertion of the skeleton card into the card insertion hole and the position of the inserted skeleton card in this prior-art card processing apparatus are unable to be detected.

SUMMARY OF THE INVENTION

The present invention was created to solve the aforementioned problems of the first and second prior-art apparatuses.

A chief object of the present invention is to provide a card processing apparatus capable of surely detecting the insertion or non-insertion of a card into the apparatus and the position of the inserted card in the apparatus regardless of whether a card to be inserted has an opaque part (e.g., an information storage part) or not, and in the case where a card to be inserted has an opaque part (e.g., an information storage part), regardless of the position of the opaque part in the card.

Another object of the present invention is to provide a card processing apparatus that makes it possible to eliminate the restriction on the existence or non-existence of an opaque part (e.g., an information storage part) of a card to be used for the apparatus and the restriction on the position of the opaque part in the card.

Still another object of the present invention is to provide a card processing apparatus that makes it possible to detect the insertion or non-insertion of a card into the apparatus and the position of the inserted card in the apparatus with a simple structure without causing any hindrance in conveyance of a card and in processing to a card (e.g., reading and writing processes of information)

The above objects together with others not specifically mentioned will become clear to those skilled in the art from the following description.

According to the present invention, a card processing apparatus is provided, which comprises:

a first card insertion section having a first card insertion hole;

a conveying section for conveying a card inserted through the first card insertion hole along a predetermined conveying path;

a conveying mechanism for conveying an inserted card forward or backward along the conveying path by driving the conveying section;

a first card detector provided at a first position in the conveying path, wherein the first position is adjacent to the first card insertion hole;

a second card detector provided at a second position in the conveying path, wherein the second position is apart from the first card detector backward along the conveying path at a predetermined distance;

a third card detector provided at a third position in the conveying path, wherein the third position is apart from the second card detector backward along the conveying path at a predetermined distance; and a control section for controlling the conveying mechanism based on a first detection signal sent from the first card detector, a second detection signal sent from the second card detector, and a third detection signal sent from the third card detector;

wherein each of the first card detector, the second card detector, and the third card detector comprises a movable operating member which is moved from a standby position to a shifted position due to contact with a card which is being conveyed on the conveying path, and a sensor for detecting a movement of the operating member from the standby position to the shifted position; and the control section judges insertion or non-insertion of a card through the first card insertion hole and a position of a card on the conveying path in response to which one of the first, second, and third detection signals is a signal notifying that a card is detected or a card is not detected.

With the card processing apparatus according to the present invention, as described above, the first card detector is provided at the first position in the conveying path, wherein the first position is adjacent to the first card insertion hole, the second card detector is provided at the second position in the conveying path, wherein the second position is apart from the first card detector backward along the conveying path at the predetermined distance, the third card detector is provided at the third position in the conveying path, wherein the third position is apart from the second card detector backward along the conveying path at the predetermined distance. Based on the first, second, and third detection signals which are respectively sent from the first, second, and third card detectors, the conveying mechanism for conveying an inserted card forward or backward along the conveying path is controlled by the control section.

Moreover, each of the first, second, and third card detectors comprises the movable operating member which is moved from the standby position to the shifted position due to contact with a card which is being conveyed on the conveying path, and the sensor for detecting a movement of the operating member from the standby position to the shifted position. In response to which one of the first, second, and third detection signals from the first, second, and third card detectors is a signal notifying that a card is detected or a card is not detected, the control section judges insertion or non-insertion of a card through the first card insertion hole and a position of a card on the conveying path.

Accordingly, the insertion or non-insertion of a card into the card processing apparatus and the position of the inserted card in the apparatus can be surely detected regardless of whether a card to be inserted has an opaque part (e.g., an information storage part) or not, and in the case where a card to be inserted has an opaque part (e.g., an information storage part), regardless of the position of the opaque part in the card.

In addition, the restriction on the existence or non-existence of an opaque part (e.g., an information storage part) of a card to be used for the card processing apparatus and the restriction on the position of the opaque part in the card can be eliminated.

Furthermore, the means for detecting the insertion or non-insertion of a card into the card processing apparatus and the means for detecting the position of the inserted card in the apparatus can be realized with simple structures without causing any hindrance in conveyance of a card and in processing to a card (e.g., reading and writing processes of information).

Further in addition, the first, second, and third card detectors are respectively provided at the first, second, and third positions, and each of the first, second, and third card detectors comprises the movable operating member which is moved from the standby position to the shifted position due to contact with a card which is being conveyed on the conveying path, and the sensor for detecting a movement of the operating member from the standby position to the shifted position. Thus, the insertion or non-insertion of a card into the card processing apparatus and the position of the inserted card in the apparatus can be detected with a simple structure without causing any hindrance in conveyance of a card and in processing to a card (e.g., reading and writing processes of information).

In a preferred embodiment of the card processing apparatus according to the present invention, in each of the first, second, and third card detectors, the standby position of the operating member is defined at a position where a card which is being conveyed on the conveying path is contactable with the operating member, wherein the operating member is moved toward outside of the conveying path due to contact with the card to reach the shifted position, and wherein the operating member is immediately returned to the standby position if the contact of the operating member with the card is released.

In another preferred embodiment of the card processing apparatus according to the present invention, the conveying section comprises a pair of sidewalls provided respectively on two sides of the conveying path; wherein in each of the first, second, and third card detectors, the operating member is provided on one of the pair of sidewalls in such a way as to be retractably projected into the conveying path.

In still another preferred embodiment of the card processing apparatus according to the present invention, in each of the first, second, and third card detectors, the operating member comprises a resilient shaft having a first fixed end and a second displaceable end, and the operating member is attached to the second end of the shaft so as to be contactable to a card conveyed on the conveying path, wherein when a card conveyed on the conveying path is contacted with the operating member, the shaft is resiliently deformed to make a movement of the operating member to the shifted position from the standby position, and the movement of the operating member is detected by the sensor.

In this embodiment, there is an additional advantage that the function of automatically returning the operating member to the standby position from the shifted position when the contact of the operating member with the card is released can be easily realized.

In this embodiment, it is preferred that the operating member is rotatable or pivotable around the shaft. Concretely speaking, it is preferred that the operating member is formed by a roller-shaped member which is rotatable or pivotable around the shaft. In this case, the operating member is rotatable or pivotable while the operating member is in contact with the card and therefore, a friction force between the side face of the operating member and the opposing side edge of the card decreases when the card is conveyed in any of the receiving direction and the ejecting direction (i.e., the forward and backward directions). This means that there is an additional advantage that the card can be conveyed more smoothly without inhibition on the movement of the card, in other words, the load applied to the card while the card is contacted with the operating member decreases and as a result, the card is prevented from being deformed and/or damaged.

In a further preferred embodiment of the card processing apparatus according to the present invention, when the first detection signal is a signal notifying that a card is detected and the second and third detection signals are signals notifying that a card is not detected, the control section judges that a card is inserted into the apparatus through the first card insertion hole, thereby conveying the card backward by driving the conveying mechanism.

In a still further preferred embodiment of the card processing apparatus according to the present invention, when all of the first, second, and third detection signals are signals notifying that a card is not detected, the control section judges that a card inserted through the first card insertion hole is completely introduced into the apparatus, thereby stopping conveyance of the card by stopping the conveying mechanism.

In a still further preferred embodiment of the card processing apparatus according to the present invention, when the control section detects successive changes of the third and second detection signals from signals notifying that a card is detected to signals notifying that a card is not detected, the control section judges that ejection of a card is instructed and stops the conveying mechanism to thereby stop conveyance of a card.

In a still further preferred embodiment of the card processing apparatus according to the present invention, a second card insertion section having a second card insertion hole is provided on the conveying path on an opposite side to the first card insertion hole; and a fourth card detector for sending a fourth detection signal is provided at a fourth position in the conveying path, wherein the fourth position is adjacent to the second card insertion hole; wherein when the fourth detection signal is a signal notifying a card is detected, the control section judges that a card is inserted through the second card insertion hole, thereby conveying the card forward by driving the conveying mechanism.

In a still further preferred embodiment of the card processing apparatus according to the present invention, in each of the first, second, and third card detectors, the operating member is formed by a roller-shaped member which is supported by a resilient shaft, and the operating member is resiliently movable to the shifted position from the standby position due to contact with a card.

In this embodiment, there is an additional advantage that the operating member can be made smaller with a simple structure.

In a still further preferred embodiment of the card processing apparatus according to the present invention, in each of the first, second, and third card detectors, the sensor is configured to detect optically a movement of the operating member due to contact with a card between the standby position and the shifted position; and when the operating member is displaced by contact with a card to the shifted position from the standby position, the sensor sends a corresponding one of the first, second, and third detection signals notifying that a card is detected.

In a still further preferred embodiment of the card processing apparatus according to the present invention, in each of the first, second, and third card detectors, the sensor comprises a light emitter for emitting a light beam along a predetermined optical axis, and a light receiver for receiving the beam; and when the operating member is displaced by contact with a card to the shifted position from the standby position, the operating member blocks the optical axis of the light emitter and the sensor sends a corresponding one of the first, second, and third detection signals notifying that a card is detected.

In a still further preferred embodiment of the card processing apparatus according to the present invention, when all of the first, second, and third detection signals from the first, second, and third card detectors are signals notifying that a card is not detected, the control section judges that an introducing process of a card introduced into the apparatus through the first card insertion hole is completed.

In a still further preferred embodiment of the card processing apparatus according to the present invention, when the fourth detection signal from the fourth detector changes from a signal notifying that a card is detected to a signal notifying that a card is not detected and thereafter, the third detection signal from the third detector changes from a signal notifying that a card is detected to a signal notifying that a card is not detected, the control section judges that an introducing process of a card introduced into the apparatus through the second card insertion hole is completed.

In a still further preferred embodiment of the card processing apparatus according to the present invention, when the third, second, and first detection signals from the third, second, and first detectors change successively from a signal notifying that a card is not detected to a signal notifying that a card is detected and thereafter, the third and second detection signals change successively from a signal notifying that a card is detected to a signal notifying that a card is not detected and the first detection signal is kept as a signal notifying that a card is detected, the control section judges that an ejecting process of a card introduced into the apparatus through the first or second card insertion hole is completed.

BRIEF DESCRIPTION OF THE DRAWINGS

In order that the present invention may be readily carried into effect, it will now be described with reference to the accompanying drawings.

FIGS. 14A to 14D are schematic views showing the card conveying state of the card processing apparatus of FIG. 1, respectively, where the card is introduced into the apparatus through the first card insertion hole.

FIGS. 16A to 16D are schematic views showing the card conveying state of the card processing apparatus of FIG. 1 respectively, where the card is introduced into the apparatus through the second card insertion hole.

FIGS. 18A and 18B are schematic views showing the card conveying state of the card processing apparatus of FIG. 1, respectively, where the card is ejected through the first card insertion hole from the inside of the apparatus.

FIG. 23A is a perspective view showing the resting state (i.e., the normal state) of the first card detector, FIG. 23B is a partial enlarged view of the part C in FIG. 23A, FIG. 23C is a perspective view showing the operating state of the first card detector, and FIG. 23D is a partial enlarged view of the part D in FIG. 23C.

DETAILED DESCRIPTION OF THE INVENTION

Figure 1:
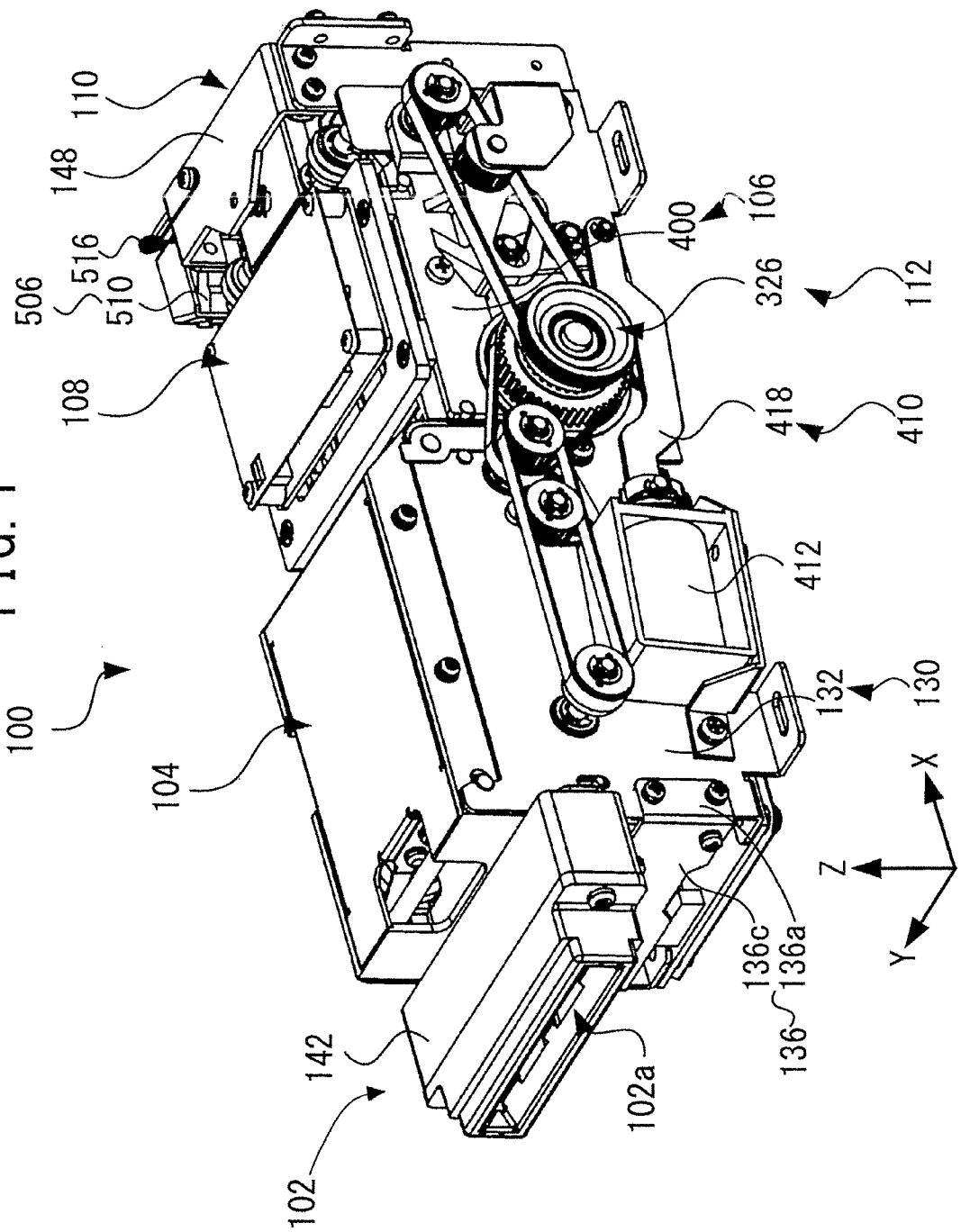
FIG. 1 is a perspective view of a card processing apparatus according to a first embodiment of the present invention, which is seen from the upper front of the apparatus to show its overall structure.

Preferred embodiments of the present invention will be described in detail below while referring to the drawings attached.

First Embodiment

A card processing apparatus 100 according to a first embodiment of the present invention is shown in FIGS. 1 to 23.

[Overall Structure of Card Processing Apparatus]

As shown in FIGS. 1 to 6, the card processing apparatus 100 according to the first embodiment comprises a first card insertion section 102 having a first card insertion hole or slot 102a, a conveying section 104 which is located behind the first card insertion section 102 to be continuous therewith, a distributing section 106 which is located behind the conveying section 104 to be continuous therewith, and a second card insertion section 110 having a second card insertion hole or slot 110a which is located behind distributing section 106 to be continuous therewith. An IC data reading/writing section 108 is located over the distributing section 106. A conveying mechanism 112 for driving the conveying section 104 is provided on the right side of the conveying section 104 and the distributing section 106.

The first card insertion section 102 introduces a card 120 in the section 102 by way of the first card insertion hole 102a and conveys the card 120 thus introduced to the conveying section 104. In this way, the card 120 is introduced into the inside of the card processing apparatus 100 from its front end.

The conveying section 104 conveys a card 120 which has been introduced into the first card insertion section 102 through the first card insertion hole 102a backward (or forward) along a first conveying path 150 (see FIG. 7) formed in the conveying section 104 by the driving force of the conveying mechanism 112.

Figure 8:
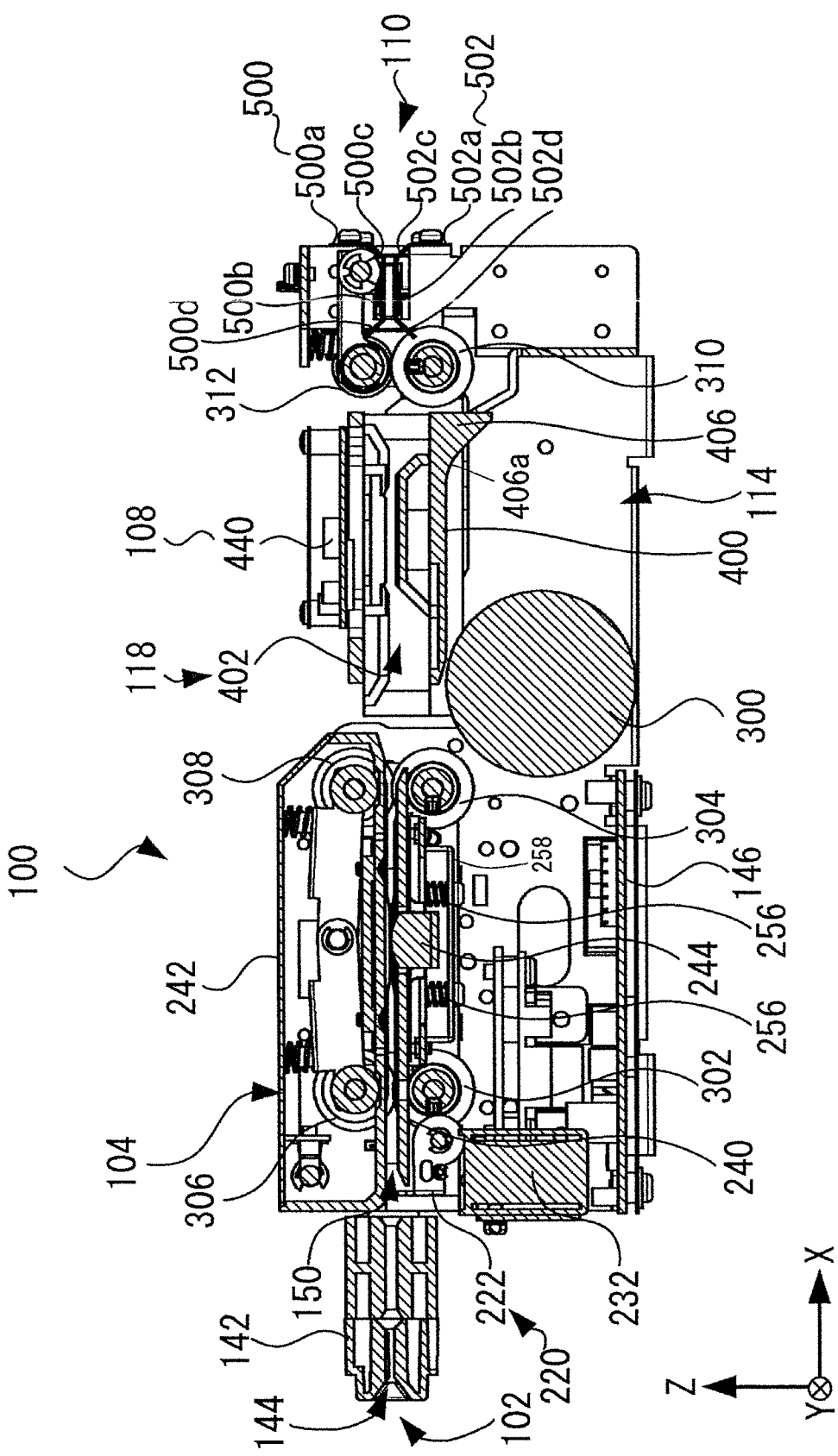
FIG. 8 is a cross-sectional view along the line VIII-VIII in FIG. 5.

The distributing section 106 opens and closes the part intervening between the first conveying section 150 and the second card insertion section 110 as necessary, thereby guiding the card 120 as a recovery target to a recovery port 114 (see FIG. 8).

The second card insertion section 110 introduces a card 120 into the section 110 by way of the second card insertion hole 110a and conveys the card 120 thus introduced to the distributing section 106. In this way, the card 120 is introduced into the inside of the card processing apparatus 100 from its rear end.

Here, X, Y, and X axes are defined as shown in FIG. 1. Specifically, the X axis is located in a horizontal plane. The X direction is the inserting direction along which a card 120 is inserted through the first card insertion hole 102a and the conveying direction of a card 120 also. The direction from the first card insertion section 102 toward the second card insertion section 110 along the X axis is termed the backward direction, and the opposite direction thereof is termed the forward direction. In FIG. 1, the X axis extends obliquely from the front left to the rear right. The Y axis is located in the horizontal plane to be perpendicular to the X axis. In FIG. 1, the Y axis extends obliquely from the front right to the rear left. The Y direction is a direction perpendicular to the conveying direction of a card 120 in the horizontal plane. The Z axis is perpendicular to the X and Y axes and the horizontal plane including the X and Y axes (i.e., the X-Y plane), and extends vertically perpendicular to the X-Y plane. The Z direction is a direction perpendicular to the horizontal plane. The card processing apparatus 100 is placed on the horizontal plane.

Figure 3:
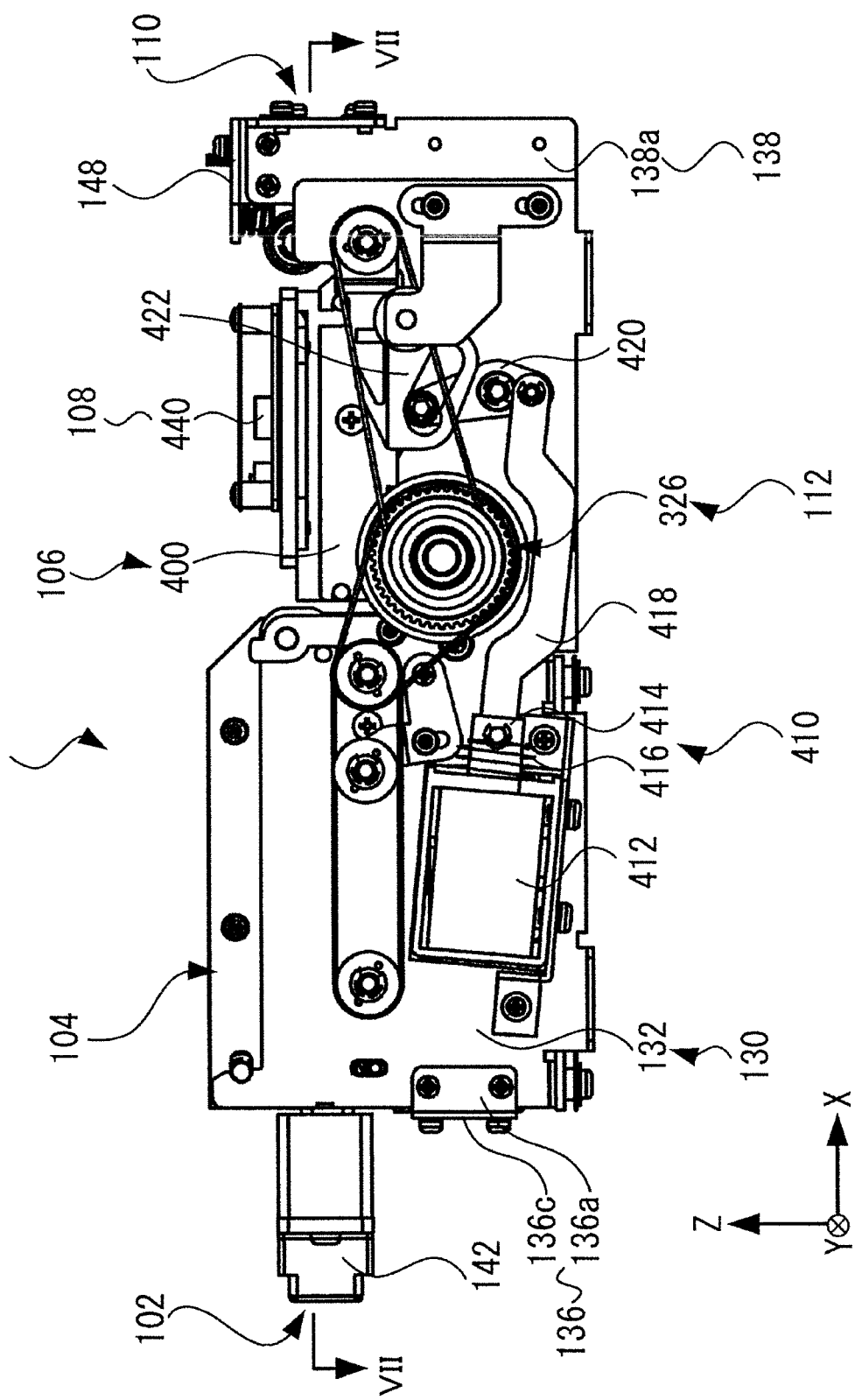
FIG. 3 is a right side view of the card processing apparatus of FIG. 1.

In addition, the rotation direction for conveying a card 120 backward along the X axis, which is a clockwise direction in FIGS. 3 and 8, is defined as the first rotation direction R1. The rotation direction for conveying a card 120 forward along the X axis, which is a counterclockwise direction in FIGS. 3 and 8, is defined as the second rotation direction R2.

As shown in FIGS. 1 to 9, the card processing apparatus 100 having the aforementioned structural elements comprises a frame 130 which has a pair of long sides extending along the X axis and a pair of short sides extending along the Y axis, where the cross section parallel to the X-Y plane (i.e., the horizontal plane) of the frame 130 is approximately rectangular. In other words, the structural elements of the card processing apparatus 100, i.e., the first card insertion section 102, the conveying section 104, the distributing section 106, the second card insertion section 110, the IC data reading/writing section 108, and the conveying section 112, are arranged along the frame 130.

The frame 130 comprises a first side plate 132 and a second side plate 134 which constitute the pair of long sides and which are opposed to each other at a predetermined interval. Moreover, the frame 130 comprises a first stay 136 and a second stay 138 which constitute the pair of short sides, in which the first stay 136 is fixed to the front ends of the first and second side plates 132 and 134 and the second stay 138 is fixed to the rear ends of the first and second side plates 132 and 134.

Figure 2:
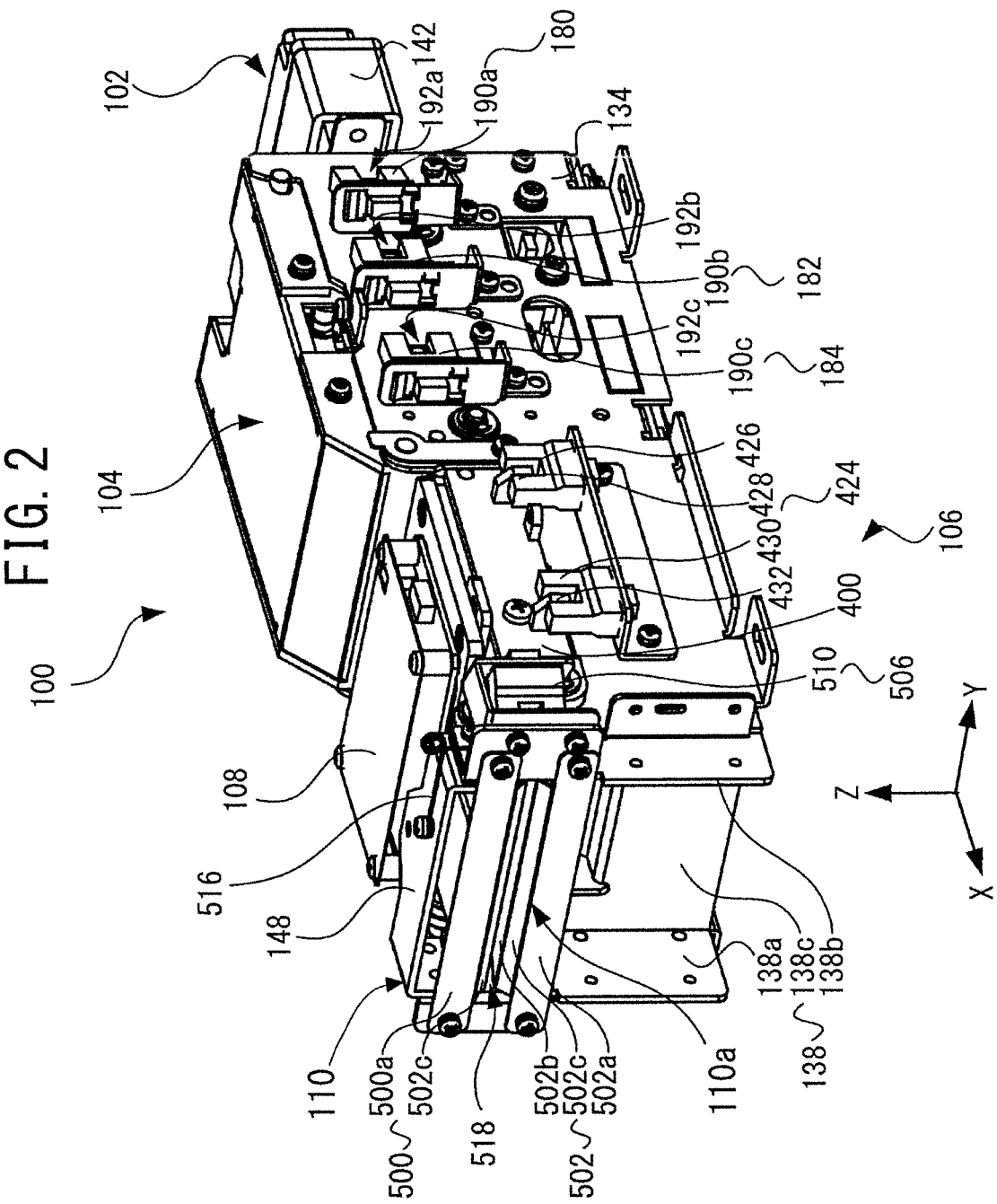
FIG. 2 is a perspective view of the card processing apparatus of FIG. 1, which is seen from the upper back of the apparatus.

The first stay 136 comprises a pair of flange parts 136a and 136b which are opposite to each other and a web part 136c which connects the pair of flange parts 136a and 136b, as shown in FIG. 1. The pair of flange parts 136a and 136b, which has a U-shaped cross section, is respectively fixed to the first and second side plates 132 and 134 with screws or the like. The second stay 138 comprises a pair of flange parts 138a and 138b which are opposite to each other and a web part 138c which connects the pair of flange parts 138a and 138b, as shown in FIG. 2. The pair of flange parts 138a and 138b, which has a U-shaped cross section, is respectively fixed to the first and second side plates 132 and 134 with screws or the like. The length of the pair of flange parts 138a and 138b of the second stay 138 in the Z direction is set to be larger than the width or height of the web part 138c in the Z direction. In other words, the second stay 138 has a U-shaped cross section in the Y-Z plane.

Figure 6:
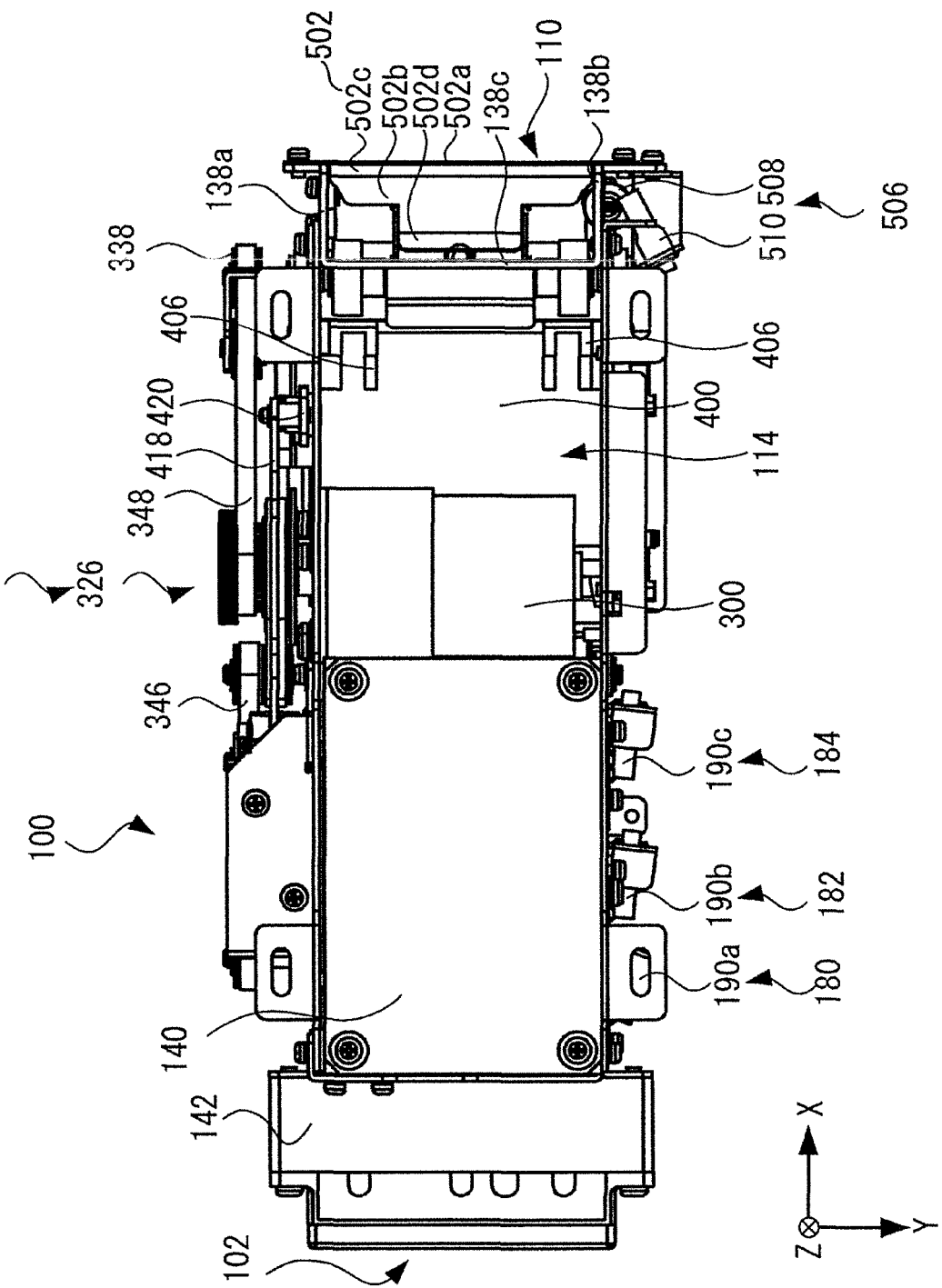
FIG. 6 is a bottom view of the card processing apparatus of FIG. 1.

The frame 130 further comprises a third stay 140 and a fourth stay 148, as shown in FIGS. 6 and 2. The third stay 140, which has a rectangular plate-shaped, is attached to the back (lower) side of the conveying section 104. The fourth stay 148 is disposed over the pair of flange parts 138a and 138b of the second stay 138. The fourth stay 148 connects the pair of flange parts 138a and 138b.

The first card insertion section 102 is provided over the first stay 136. The second card insertion section 110 is provided over the second stay 138, more specifically, the web part 138c of the second stay 138.

The first card insertion section 102, the conveying section 104, the distributing section 106, and the second card insertion section 110 are arranged in this order along the longitudinal direction of the frame 130 (i.e., the X direction). The first card insertion hole 102a, a first conveying path 150 of the conveying section 104 which will be explained later, a second conveying path 402 of the distributing section 106 which will be explained later, and the second card insertion hole 110a are formed so as to be approximately flush and to communicate with each other, thereby constituting a linear conveying path 118 in the card processing apparatus 100.

On the opposite side of the first side plate 132 to the second side plate 134, in other words, on the external side face of the frame 130 (on the external side face on the right side in FIG. 1), a drivably connecting section 326 of the conveying mechanism 112 for conveying a card 120 placed on the conveying path 118, and a switching mechanism 410 for switching between the connection state of the first conveying path 150 and the second conveying path 402 and the connection state of the first conveying path 150 and a recovery passage 404 of the distributing section 106 are provided.

On the opposite side of the second side plate 134 to the first side plate 132, in other words, on the external side face of the frame 130 (on the external side face on the left side in FIG. 1), first, second, third, and fourth card detectors 180, 182, 184, and 506 for detecting a card 120 placed on the conveying path 118, and a state detecting section 424 for detecting the state of the distributing section 106 are provided.

Figure 9:
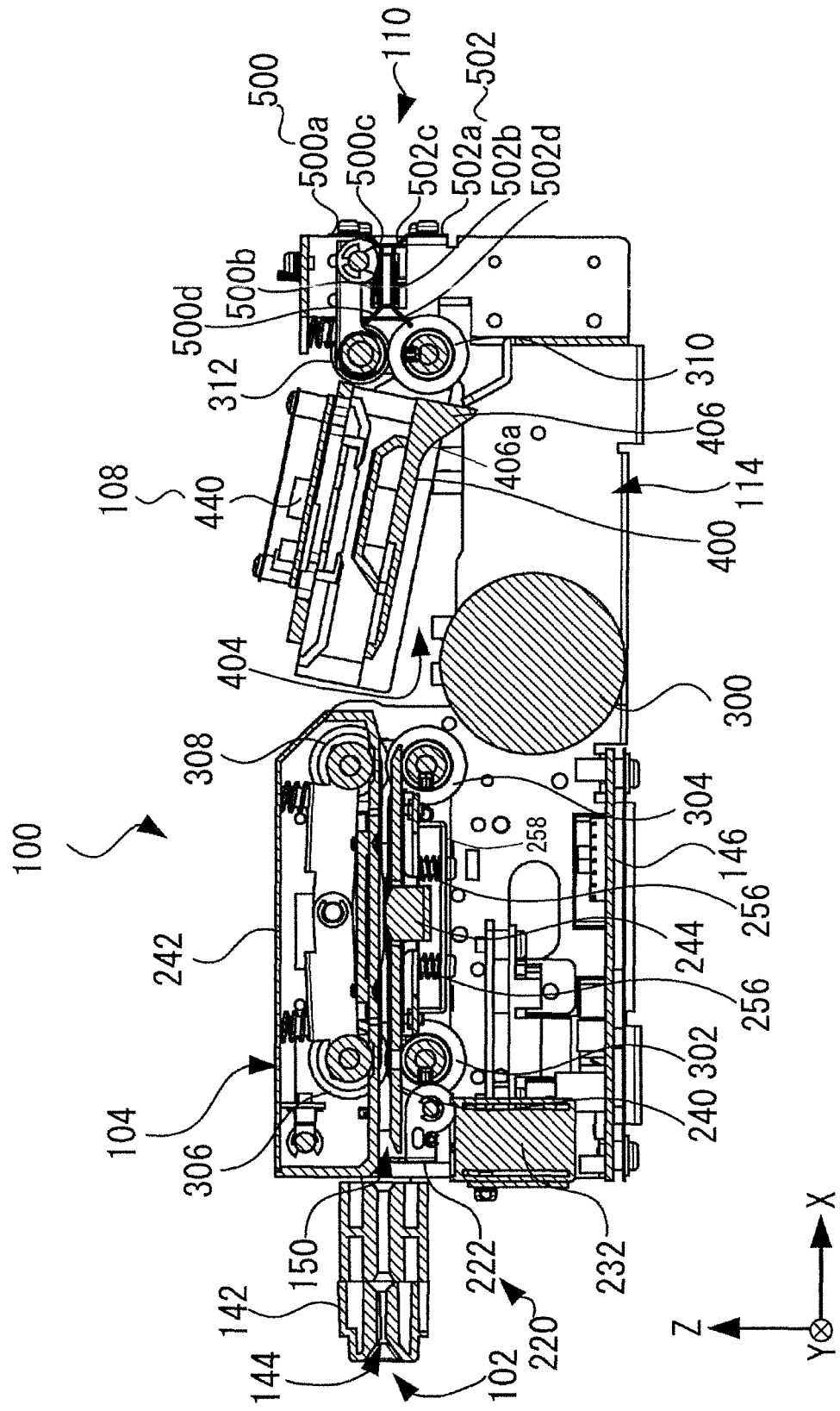
FIG. 9 is a cross-sectional view along the line VIII-VIII in FIG. 5, which shows the card recovering state of the card processing apparatus of FIG. 1.

On the upper surface of the third stay 140, which is in the inside of the card processing apparatus 100, a control section 146 for controlling the operation of the card processing apparatus 100 is provided, as shown in FIGS. 8 and 9.

[First Card Insertion Section]

Next, the first card insertion section 102 will be explained below in detail with reference to FIG. 1 and FIGS. 3 to 9.

Figure 7:
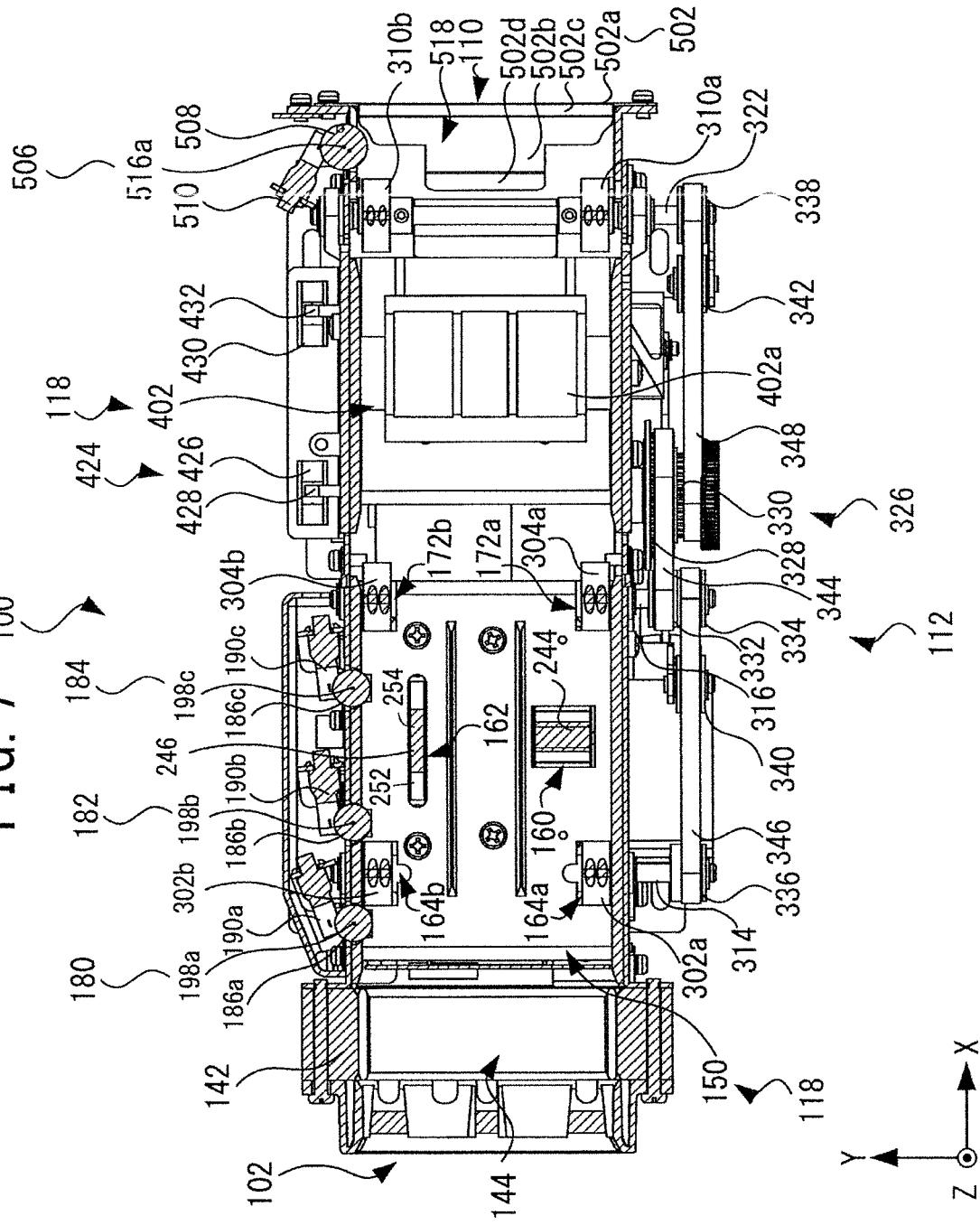
FIG. 7 is a cross-sectional view along the line VII-VII in FIG. 3.

The first card insertion section 102 has the function of receiving a card 120 through the first card insertion hole 102a and the function of guiding the card 120 thus received toward the conveying section 104. The first card insertion section 102 in this first embodiment is formed by a rectangular convex pillar 142 in a plan view and is screwed onto the frame 130. A penetrating hole 144, which is formed in the pillar 142 to extend along its protruding direction (i.e., along the X axis), communicates with the first card insertion hole 102a formed at the front end of the pillar 142, as shown in FIG. 7. The hole 144 has an approximately rectangular cross-sectional shape which is parallel to the plane (i.e., Y-Z plane) perpendicular to the X axis. The width of the hole 144 is slightly larger than the length of the pair of short sides of a card 120, and the thickness of the hole 144 is slightly larger than the thickness of a card 120 and is smaller than the total thickness of two stacked cards 120. The first card insertion hole 102a is one size larger than the hole 144. A card 120 inserted into the first card insertion hole 102a is sent to the conveying section 104 through the penetrating hole 144 while being guided by the inner walls of the hole 144.

The shape of the first card insertion section 102 is not limited to the one described here. The section 102 may have any shape, such as a cylindrical shape other than the rectangular convex pillar shape. It is sufficient that the penetrating hole 144 may be formed directly in the frame 130 without forming the pillar 142. In this case, the front end of the hole 144 serves as the first card insertion hole 102a. It is needless to say that the shape and structure of the first card insertion section 102 may be changed appropriately according to the purpose or use.

[Shutter Mechanism]

A shutter mechanism 220 is provided between the first card insertion section 102 and the conveying section 104, more specifically, between the penetrating hole 144 of the first card insertion section 102 and the first conveying path 150 of the conveying section 104, as shown in FIGS. 8 to 10. The shutter mechanism 220 has the function of limiting the conveyance of a card 120 from the first card insertion section 102 to the first conveying path 150.

The shutter mechanism 220 comprises a shutter 222 formed pivotable between the first position P1 where the communication between the first conveying path 150 and the first card insertion section 102 is blocked and the second position P2 where the communication between the path 150 and the section 102 is ensured, a first solenoid 232 for driving (or pivoting) the shutter 222, and a movable shaft 230 for transmitting the driving force of the first solenoid 232 to the shutter 222.

Figure 10A:
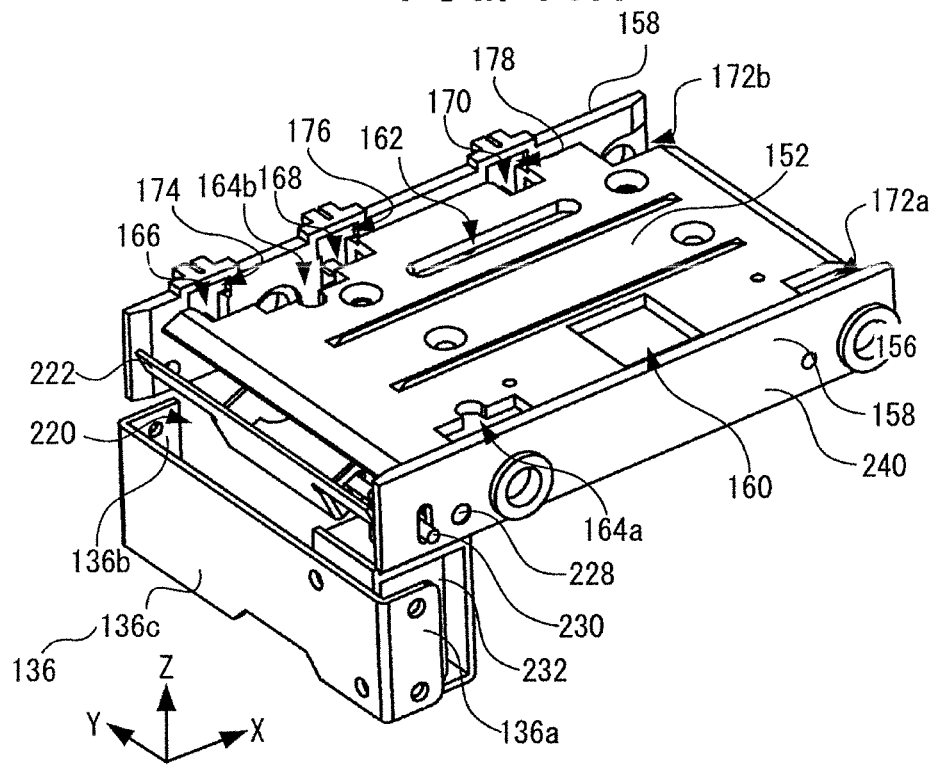
FIGS. 10A and 10B are perspective views showing the shutter mechanism of the card processing apparatus of FIG. 1.

The first solenoid 232 is placed on the side of the first side plate 132 of the first stay 136 and is fixed to the inside of the frame 130 by way of a bracket, as shown in FIG. 10A. The plunger 232a of the first solenoid 232 is connected to one end of the movable shaft 230.

Figure 10B:
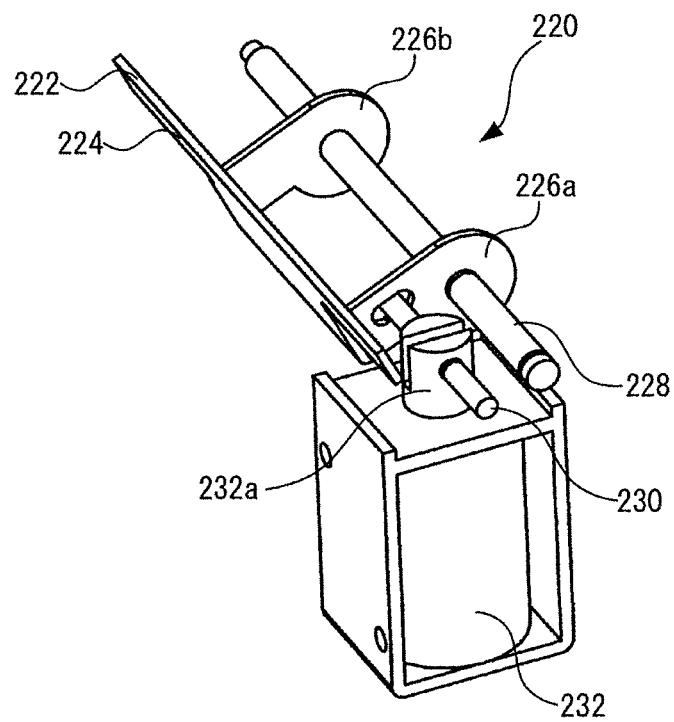

The shutter 222 comprises a plate-shaped limiting part 224 having a rectangular protrusion on its central position, and a pair of connecting parts 226a and 226b which is protruded from the both sides of the protrusion approximately perpendicularly, as shown in FIGS. 10A and 10B. The connecting parts 226a and 226b have circular penetrating holes which are formed at superposed positions, through which a rotation shaft 228 is inserted. The rotation shaft 228 is fixed to the first and second side plates 132 and 134. Thus, the shutter 222 is structured to be pivotable around the rotation shaft 228. On the connecting part 226a located near the first side plate 132, an elliptical through hole is formed between the aforementioned circular penetrating hole and the limiting part 224. One end of the movable shaft 230 is inserted into the elliptical through hole, where the shaft 230 is engaged with the plunger 232a of the first solenoid 232. The driving force of the first solenoid 232 is transmitted to the shutter 222 by way of the plunger 232a and the shaft 230.

The shutter 222 is normally held at the first position P1. Therefore, the connection between the first conveying path 150 and the first card insertion section 102 is normally blocked, thereby preventing a card 120 from being delivered to the first conveying path 150. If an instruction for opening the shutter 222 is outputted to the card processing apparatus 100 from an external device 1 (see FIG. 19), a driving control signal for the first solenoid 232 is outputted from the control section 146 of the apparatus 100. In response to the driving control signal, the first solenoid 232 is driven to move the shutter 222 to the second position P2. In this way, the connection between the first conveying path 150 and the first card insertion section 102 is made, thereby enabling a card 120 to be delivered to the first conveying path 150.

In this first embodiment, an ordinary pull-solenoid is used as the first solenoid 232 and thus, if the first solenoid 232 is energized, the plunger 232a is pulled into the inside of the solenoid 232 and the shutter 222 is pivoted or rocked from the first position P1 to the second position P2. Due to such the movement, the first conveying path 150 and the first inserting section 102 are communicated with each other. On the other hand, if the first solenoid 232 is de-energized, the plunger 232a is pushed out from the inside of the solenoid 232 and the shutter 222 is pivoted or rocked from the second position P2 to the first position P1. Due to such the movement, the communication between the first conveying path 150 and the first inserting section 102 is blocked.

In addition, a pull-solenoid is used as the first solenoid 232 in this embodiment; however, the driving source for the shutter mechanism 220 is not limited to this and any other type of the driving source, such as a push solenoid, a rotary solenoid, and a motor may be used for this purpose.

[Conveying Section]

Next, the conveying section 104 will be explained in detail below with reference to FIGS. 1 to 13.

The conveying section 104 has the function of conveying a card 120 forward or backward (along the X axis) and the function of reading the magnetic data stored in a magnetic stripe formed on a card 120 and of writing data into the magnetic stripe.

The conveying section 104 is constituted by a first unit 240 in which a magnetic head 244 and other parts are arranged and a second unit 242 disposed on the upper part of the first unit 240, as shown in FIGS. 8 and 9. A plate-shaped gap through which a card 120 can pass is formed between the first and second units 240 and 242. The gap thus formed serves as the first conveying path 150.

The first conveying path 150 has the bottom surface 152, the top surface opposed to the bottom surface 152, and the first and second sidewalls 156 and 158 formed respectively on the two sides of the bottom surface 152 which extend parallel to the X axis. Similar to the penetrating hole 144 of the first inserting section 102, the cross section of the first conveying path 150 parallel to the Y-Z plane has an approximately rectangular shape, the width of which is slightly larger than the pair of short sides of a card 120 and the height of which is slightly larger than the thickness of the card 120. As described previously, the first conveying path 150 is formed between the first and second units 240 and 242 and thus, the bottom surface 152 of the first conveying path 150 corresponds to the upper surface of the first unit 240 and the top surface of the first conveying path 150 corresponds to the lower surface of the second unit 242. The first and second sidewalls 156 and 158 serve as spacers placed between the upper surface of the first unit 240 and the lower surface of the second unit 242, thereby forming the first conveying path 150 between the first and second units 240 and 242.

On the bottom surface 152 of the first conveying path 150, as clearly shown in FIGS. 7 and 10A, there are provided with a first through hole 160 in which the magnetic head 244 is located, a second through hole 162 in which a supporting part 246 that supports a card 120 in corporation with the magnetic head 244 is located, a pair of third through holes 164a and 164b in which a pair of rollers 302a and 302b of a first conveying roller device 302 of the conveying mechanism 112 is respectively placed, a pair of cutout portions 172a and 172b in which a pair of rollers 304a and 304b of a second conveying roller device 304 is respectively placed, and fourth, fifth, and sixth through holes 166, 168, and 170 in which the first, second, and third card detectors 180, 182, and 184 are respectively located.

The first through hole 160, which is approximately rectangular, is located at a position which is approximately in the middle of the two sides of the bottom surface 152 extending along the X axis. The hole 160 is apart from the first sidewall 156 at a predetermined distance. More specifically, the first through hole 160 is formed at a position opposed to the information storage part (e.g., a magnetic stripe of an ordinary magnetic stripe card) of a card 120 that is being conveyed on the first conveying path 150.

The second through hole 162, which has an approximately rectangular shape and the pair of long sides of this shape is parallel to the X axis, is located at a position which is approximately in the middle of the two sides of the bottom surface 152 extending along the X axis. The hole 162 is apart from the first sidewall 156 at a predetermined distance. With respect to the position along the X axis, the second through hole 162 is located at approximately the same position as the first through hole 160. Since the second through hole 162 is formed in this way, a card 120 is supported by both of the magnetic head 244 and the supporting part 246, as shown in FIG. 7. Therefore, the attitude of a card 120 during conveyance is stabilized when reading or writing the magnetic data stored in the information storage part (i.e., magnetic stripe) of the card 120.

The pair of third though holes 164a and 164b is formed near the upstream-side end (which is close to the first card insertion section 102) of the bottom surface 152. The third through hole 164a is placed near the first sidewall 156 and the third through hole 164b is placed near the second sidewall 158 so as not to be opposed to the information storage section (i.e., magnetic stripe) of a card 120 during conveyance.

The pair of cutout portions 172a and 172b is located at the opposite end of the bottom surface 152 to the first card insertion section 102 (which is close to the second card insertion section 110). The cutout portion 172a is placed near the first sidewall 156 and the cutout portion 172b is placed near the second sidewall 158 so as not to be opposed to the information storage section (magnetic stripe) of a card 120 during conveyance.

The pair of rollers 302a and 302b constituting the first conveying roller device 302 is located in the pair of third though holes 164a and 164b. The pair of rollers 304a and 304b constituting the second conveying roller device 304 is located in the pair of cutout portions 172a and 172b. For this reason, the third through holes 164a and 164b and the cutout portions 172a and 172b are not to be opposed to the information storage section (i.e., magnetic stripe) of a card 120, which means that the rollers 302a, 302b, 304a, and 304b are not to be in contact with the information storage section of a card 120. Accordingly, the information storage section of a card 120 can be prevented from being broken during conveyance.

The fourth through hole 166 is formed at a position near the front end of the second sidewall 158 (which is closer to the first card insertion section 102 than the third through hole 164b). The fifth and sixth through holes 168 and 170 are formed between the third through hole 164b and the cutout portion 172b so as to be arranged in this order.

Figure 11A:
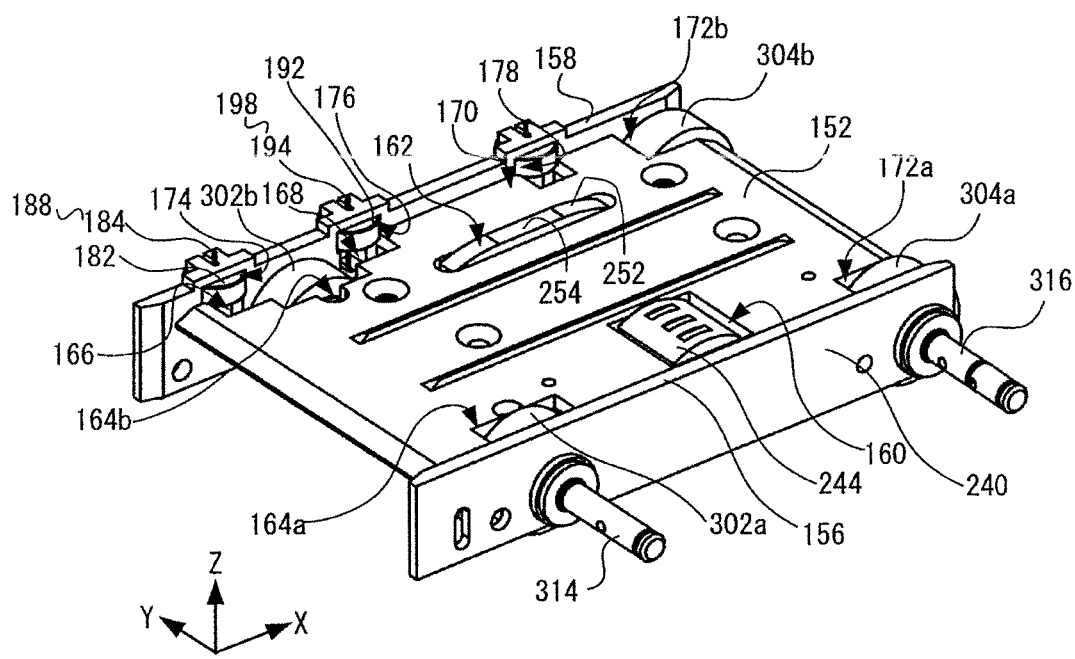
FIG. 11A is a perspective view showing the first conveying section of the card processing apparatus of FIG. 1.
Figure 11B:
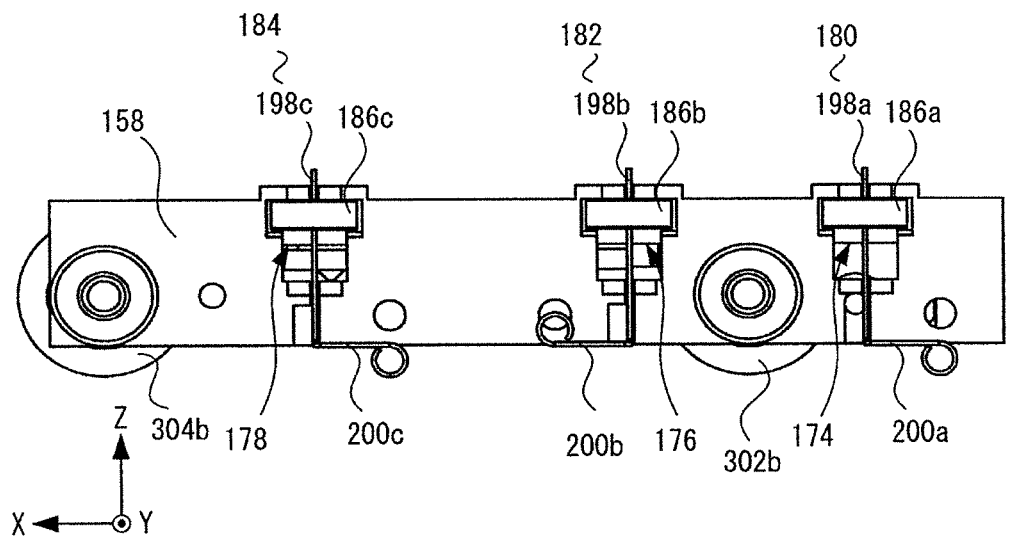
FIG. 11B is a side view thereof.

On the second sidewall 158, seventh, eighth, and ninth through holes 174, 176, and 178 are respectively formed at the positions corresponding to the fourth, fifth, and sixth through holes 166, 168, and 170, as shown in FIG. 7 and FIGS. 11A and 11B. Rollers 186a, 186b, and 186c of the first, second, and third card detectors 180, 182, and 184, which will be explained in detail later, are located in the seventh, eighth, and ninth through holes 174, 176, and 178, respectively. For this reason, the interval between the pair of lateral edges (which are parallel to the X axis) of each of the through holes 174, 176, and 178 is larger than the thickness (i.e., the length parallel to the Z axis) of a corresponding one of the rollers 186a, 186b, and 186c. The pair of vertical edges (which are parallel to the Z axis and perpendicular to the bottom surface 152) of each of the through holes 174, 176, and 178 is tapered in such a way that the distance of the vertical edges of this pair increases gradually as these vertical edges move away from the first conveying path 150 along the Y axis. Due to such the structures as described here, the interval between the near ends (which are close to the first conveying path 150) of each of the seventh, eighth and ninth through holes 174, 176, and 178 is made smaller than the diameter of a corresponding one of the rollers 186a, 186b, and 186c. As a result, the interval between the far ends (which are distant from the first conveying path 150) of each of the through holes 174, 176, and 178 is made larger than the diameter of a corresponding one of the rollers 186a, 186b, and 186c.

In addition, with the card processing apparatus 100 according to this first embodiment, the third, fourth, and fifth through holes 164b, 166, and 168 are formed to be connected to each other, thereby forming a combined through hole. However, the third, fourth, and fifth through holes 164b, 166, and 168 may be formed integrally or separately. The cutout portions 172a and 172b may be formed as through holes like the third through holes 164a and 164b. The third, fourth, fifth, and sixth through holes 164b, 166, 168, and 170 and the cutout portion 172b may be formed integrally to thereby form a single through hole or a single cutout part.

Figure 12:
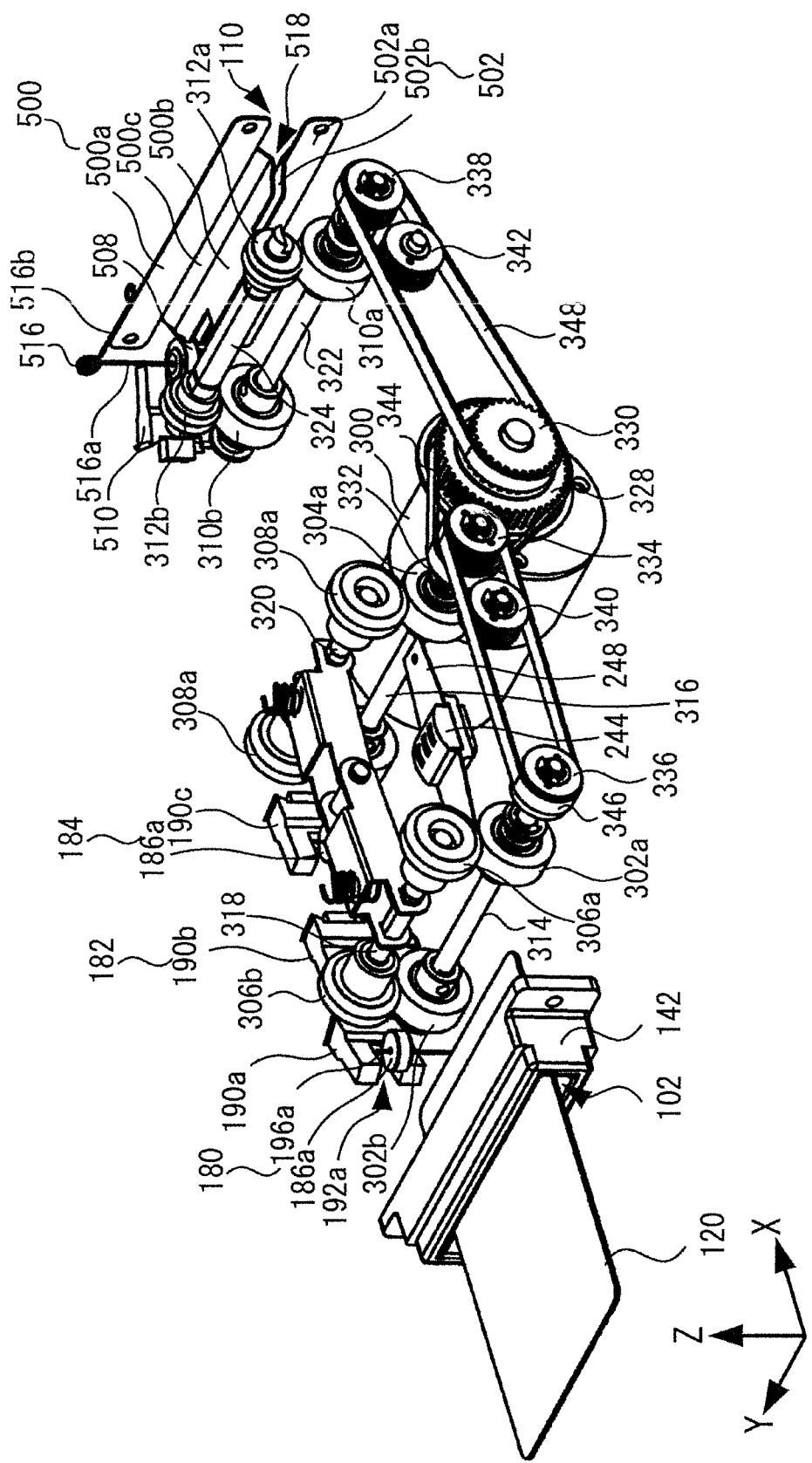
FIG. 12 is a perspective view showing the structure of the conveying mechanism of the card processing apparatus of FIG. 1, which is seen from the side of the first card insertion section of the apparatus.

The magnetic head 244 has the function of reading magnetic data stored in the information storage section or the magnetic stripe of a card 120 which is conveyed on the first conveying path 150 and the function of writing data into the information storage section or the magnetic stripe. As shown in FIG. 12, the magnetic head 244 is located at an approximately central position of a plate spring 248 and is inserted into the first through hole 160 from the back (lower side) of the bottom surface 152 of the first conveying path 150. Two ends of the plate spring 248 are fixed on the back of the bottom surface 152 of the first conveying path 150. The magnetic head 244 is urged by the plate spring 248 toward the upper side of the bottom surface 152, in other words, the inside of the first conveying path 150. Therefore, the magnetic head 244 can be rocked or pivoted in the direction perpendicular to the bottom surface 152 (i.e., along the Z axis) according to movements of a card 120. Here, the plate spring 248 is located on the back side of the bottom surface 152 by way of a fixing member 258, as shown in FIG. 8; however, the plate spring 248 may be directly fixed on the bottom surface 152.

As shown in FIG. 7, the supporting part 246 has the function of keeping the attitude of a card 120 to be conveyed on the first conveying path 150 in cooperation with the magnetic head 244. The supporting part 246 comprises a flat portion 252 which is rectangular in a plan view, and a protruding portion 254 which protrudes from the center of the flat portion 252 and which is rectangular in a plan view. The protruding portion 254 is inserted into the second through hole 162 from the back (lower) side of the bottom surface 152 in such a way that the protrusion amount of the magnetic head 244 from the bottom surface 152 is approximately equal to the protrusion amount of the protruding portion 254 from the bottom surface 152. On the upper face of the protruding portion 254, slopes are formed at two ends of this upper face along the X axis, where the end of each slope is extended to the back side of the bottom surface 152. Due to such the structure as described here, a card 120 during conveyance can be moved smoothly from the bottom surface 152 to the protruding portion 254 without catching the card 120 at the two ends of the protruding portion 254 in the X direction.

Under the supporting part 246, the fixing member 258 is fixed on the bottom surface 152 (See FIGS. 8 and 9). A pair of screws is inserted from the opposite side of the flat plate part 252 into the planar part of the fixing member 258 which is opposed to the flat plate part 252. A spring is fitted to each of these screws. One end of each spring 256 is abutted on the planar part of the fixing member 258 and the other end thereof is abutted on the back side of the flat plate part 252, thereby urging the supporting part 246 to move toward the right side of the bottom surface 152 (i.e., the first conveying path 150). Accordingly, the supporting part 246 also is rockable or pivotable along the Z axis (i.e., vertically) similar to the magnetic head 244.

In the card processing apparatus 100 according to this embodiment, the pair of springs 256 is fitted to the pair of screws which is inserted into the planar part of the fixing member 258. However, a shaft for inserting the pair of springs may be additionally formed on the fixing member 258. The count of the springs for urging the supporting part 246 may be unity or three or more. Although coil springs are used as the springs 256 in this embodiment, plate springs may be used for this purpose similar to the magnetic head 244.

[First, Second, and Third Card Detectors]

Next, the first, second, and third card detectors 180, 182, and 184 will be explained below in detail with reference to FIGS. 2, 4, 7, 10, 11, and 23.

In the second side plate 134, through holes (not shown) are formed at corresponding positions to the seventh, eighth, and ninth through holes 174, 176, and 178 of the second sidewall 158. Therefore, the seventh, eighth, and ninth through holes 174, 176, and 178 are all opened to the outside of the second side plate 134 by way of the corresponding through holes of the second side plate 134. The first, second, and third card detectors 180, 182, and 184 are placed in the seventh, eighth, and ninth through holes 174, 176, and 178, respectively.

Figure 13:
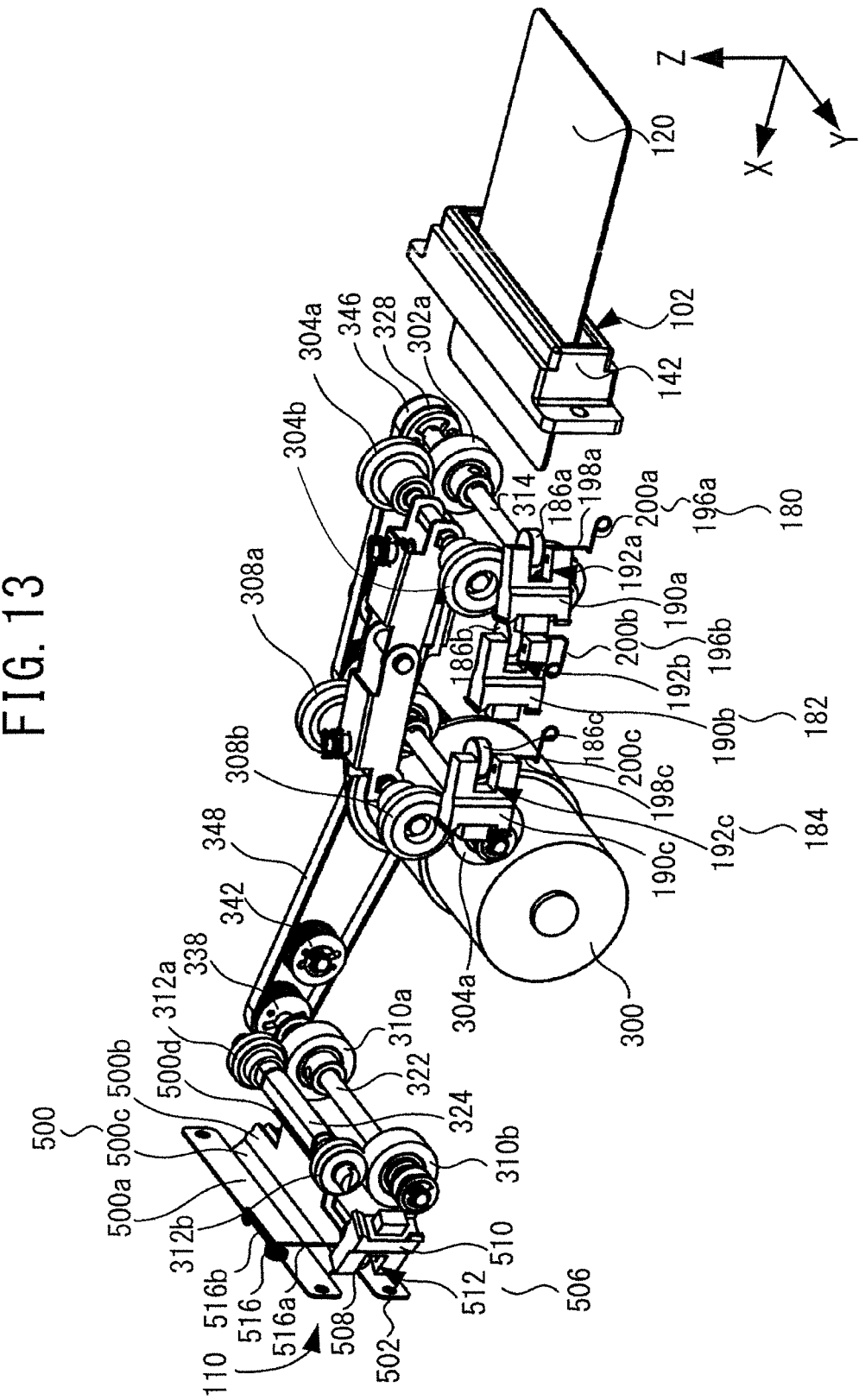
FIG. 13 is a perspective view showing the structure of the conveying mechanism of the card processing apparatus of FIG. 1, which is seen from the side of the second card insertion section of the apparatus.

As clearly shown in FIGS. 2, 7, and 13, the first card detector 180 comprises the roller 186a, the rotation shaft for the roller 186a, and a sensor 190a for detecting the existence and non-existence of a card 120. The roller 186a is rotatable around a rotation axis parallel to the Z axis and is rockable along the Y axis (i.e., in the direction perpendicular to the conveyance direction of a card 102) due to the pushing action of a card 102. The rotation shaft supports rotatably the roller 186a and urges the roller 186a to move toward the inside of the first conveyance path 150. The sensor 190a detects the rocking or pivoting motion of the roller 186a along the Y axis (i.e., in the direction perpendicular to the conveyance direction of a card 102), thereby finding the existence and non-existence of a card 120 in the first conveyance path 150.

The roller 186a is formed by a circular plate-shaped or cylindrical rotator and has a shaft hole 188a formed at the centers of the top and bottom circular surfaces. A first shaft 198a of a wire or torsion spring 196a serving as the aforementioned rotation shaft of the roller 186a is inserted into the shaft hole 188a, and the roller 186a is rotatable or pivotable around the first shaft 198a. The wire spring 196a comprises a second shaft 200a in addition to the first shaft 198a, in which the first and second shafts 198a and 200a form an L-like shape. The first shaft 198a extends along the Z axis and is located at the central position of the first through hole 174 in the X direction. The second shaft 200a, which extends along the X axis, is fixed to the second side plate 134 with a screw or the like. The roller 186a is located in the seventh through hole 174 and is urged to move toward the first conveying path 150 by the wire spring 196a. In this way, the roller 186a is configured to be movable to the inside of the first conveying path 150. When the roller 186a is located at the standby position P5a, the minimum interval between the side face of the roller 186a and the first sidewall 156 of the first conveying path 150 is set to be smaller than the pair of short sides of a card 120.

The sensor 190a is a transmission type photosensor which comprises an approximately U-shaped body with a gap 192a, and a pair of a light projector or emitter and a light receiver located to be opposite to each other at the two ends of the body, respectively. The sensor 190a is fixed to the second side plate 134 by way of a bracket which is provided corresponding to the seventh through hole 174 on the opposite side (i.e., the outer side) of the second side plate 134 to the first conveying path 150. The optical axis 194a of the light illuminated to the light receiver of the sensor 190a from the light emitter thereof is parallel to the Z axis. The roller 186a can be moved into the gap 192a of the sensor 190a.

When the roller 186a is held at the standby position P5a due to the urging force of the wire spring 196a, the roller 186a is moved into the first conveying path 150 and departed from the gap 192a of the sensor 190a, where the roller 186a does not block the optical axis 194a of the sensor 190a. On the other hand, when the roller 186a is moved to the shifted position P6a against the urging force of the wire spring 196a, the roller 186a is departed from the first conveying path 150 and moved into the gap 192a of the sensor 190a, thereby blocking the optical axis 194a of the sensor 190a.

Since the minimum interval between the side face of the roller 186a and the first sidewall 156 of the first conveying path 150 is set to be smaller than the pair of short sides of a card 120, the roller 186a is contacted with the side face (which is close to the second side plate 134) of a card 120 and displaced along the Y axis. As a result, the roller 186a can be pressed toward the shifted position P6a from the standby position P5a and departed from the first conveying path 150. Accordingly, when a card 120 reaches the first card detector 180, the roller 186a is pressed by the side face of the card 120 to the shifted position P6a from the standby position P5a, and the roller 186a enters the gap 192a of the sensor 190a, thereby blocking the optical axis 194a. When the optical axis 194a is blocked by the roller 186a, the sensor 190a outputs a first detection signal SS1 to the control section 146. When the first detection signal SS1 is inputted into the control section 146 in this way, the control section 146 judges that the card 120 has been detected by the first card detector 180. This means that the card 120 is detected by the sensor 190a by way of the roller 186a.

The second card detector 182 and the third card detector 184 have the same structure as the first card detector 180. Therefore, by attaching the same reference numerals as those of the first card detector 180 to the same structural elements in the second and third card detectors 182 and 184 and adding indexes "b" and "c" to these numerals, the structural elements of the second and third card detectors 182 and 184 are indicated for simplification. In other words, since the index "a" is attached to the reference numerals in the first card detector 180, the index "b" is attached to the reference numerals in the second card detector 182 and the index "c" is attached to those in the third card detector 182, thereby discriminating these three detectors 180, 182, and 184. Strictly speaking, the roller 186b of the second card detector 182 is located in the eighth through hole 176b and the roller 186c of the third card detector 184 is located in the ninth through hole 178 and thus, the structures of the second and third card detectors 182 and 184 are slightly different from that of the first card detector 180. However, the other structural elements are the same. Accordingly, the detailed explanation for the second and third card detectors 182 and 184 is omitted here.

In the first, second, and third card detectors 180, 182, and 184, the existence of a card 120 is detected by detecting the movements (i.e., displacements) of the rollers 186a, 186b, and 186c which are caused by the contact and press with the opposing side of the card 102. Therefore, even if a card 120 is a skeleton card having transparency in its entirety, there arises no malfunction that the card 120 is unable to be detected by any of the first, second, and third card detectors 180, 182, and 184.

In the upper surface (i.e., the lower surface of the second unit 242) of the first conveying path 150, a pair of tenth through holes (not shown), a pair of eleventh through holes (not shown), a pair of twelfth through holes (not shown), and a thirteenth through hole (not shown) are formed. The pair of tenth through holes, which is approximately rectangular in shape, is opposite to the pair of third through holes 164a and 164b formed in the bottom surface 152. A pair of rollers 306a and 306b of a third conveying roller device 306 is located in the pair of tenth through holes. The pair of eleventh through holes, which is approximately rectangular in shape, is opposite to the pair of cutout portions 172a and 172b formed in the bottom surface 152. A pair of rollers 308a and 308b of a fourth conveying roller device 308 is located in the pair of eleventh through holes (see FIGS. 10A, 11A, and 12).

The pair of twelfth through holes, which is approximately rectangular in shape, is opposite to the first through hole 160 formed in the bottom surface 152. A pair of supporting parts (not shown) is located in the pair of twelfth through holes in such a way that a card 120 is sandwiched by the magnetic head 244 and the pair of supporting parts. The thirteenth through hole, which is approximately rectangular in shape, is opposite to the second through hole 162 formed in the bottom surface 152. A supporting part (not shown) is inserted into the thirteenth through hole in such a way that a card 120 is sandwiched by this supporting part in corporation with the supporting part 246 (see FIG. 7) (see FIGS. 7, 10A, and 11A).

[Distributing Section]

Next, the distributing section 106 will be explained in detail with reference to FIGS. 1 to 10.

The distributing section 106 has the function of guiding a target card 120 to the recovery port 114 by closing the passage between the first conveying path 150 and the second card insertion section 110. As shown in FIGS. 7 to 9, the distributing section 106 comprises a distributing member 400 which is movable between the third position P3 at which the passage between the first conveying path 150 and the second card insertion section 110 is opened and the fourth position P4 at which the same passage is closed, the state detecting section 424 for detecting which one of the third and fourth positions P3 and P4 the distributing member 400 is located at, and the switching mechanism 410 for pivoting the distributing member 400 between the third and fourth positions P3 and P4.

In the following explanation, each direction (i.e., the X, Y, and Z axes) is defined by using the situation where the distributing member 400 is located at the third position P3 as a reference.

The distributing member 400, whose cross section parallel to the Y-Z plane is like an H character, comprises a pair of sidewalls whose long sides are extended along the X axis and a web portion interconnecting the pair of sidewalls. The rear ends (i.e., the ends on the opposite side to the first conveying path 150) of the pair of sidewalls are rotatably held on a fifth rotation shaft 322 of a fifth roller device 310 of the conveying mechanism 112 which will be explained later (see FIGS. 5, 12, and 13). Thus, the distributing member 400 can be rocked or pivoted around the fifth rotation shaft 322 between the third and fourth positions P3 and P4.

On the surface side of the web portion of the distributing member 400, the second conveying path 402 for conveying a card 120 along the X axis is formed. Similar to the first conveying path 150, the second conveying path 402 has an approximately rectangular cross section parallel to the Y-Z plane (i.e., a vertical cross section) which is slightly larger than the short side length of a card 120 and which is slightly larger than the thickness of the card 120. The bottom surface 402a of the second conveying path 402 is formed by the web portion (see FIG. 7). A pair of side faces of the second conveying path 402 is formed by the pair of sidewalls of the web portion. Moreover, a top surface of the second conveying path 402 is formed above the bottom surface 402a to be parallel to the same. The bottom surface 402a of the second conveying path 402 is structured in such a way as to be approximately flush with the bottom surface 152 of the first conveying path 150 when the distributing member 400 is located at the third position P3. In this way, a card 120 conveyed along the X axis can be smoothly moved between the first conveying path 150 and the second conveying path 402.

On the top surface of the second conveying path 402, an antenna 440 is provided for reading data stored in the noncontact-type IC chip mounted in a card 120 and for writing data into the chip (see FIG. 8). The antenna 440 is located on the path or track of the IC chip along the X axis. When the card 120 is conveyed along the X axis on the first and second conveying paths 150 and 402 and the IC chip mounted on the card 120 reaches the antenna 440, the data is read out from the IC chip in response to an IC data reading control signal IDR outputted from the control section 146, and data is written into the IC chip in response to an IC data writing control signal IDW outputted from the control section 146.

On the back or lower side of the web portion of the distributing member 400, the recovery passage 404 is provided for guiding a card 120 to the recovery port 114. On the back of the web portion, a pair of guiding members 406 which protrudes toward the recovery port 114 is formed at the rear end of the web portion. The end faces 406a of the guiding members 406, which are close to the first conveying path 150, are concavely curved or sloped. By this structure, the leading end of a card 120 which has been guided to the recovery passage 404 from the first conveying path 150 is contacted with the end faces 406a of the guiding members 406 and guided by the end faces 406a to the recovery port 114.

On the side of the frame 130, which is close to the first side plate 132, as shown in FIG. 3, the switching mechanism 410 is provided for pivoting the distributing member 400 between the third position P3 and the fourth position P4. The switching mechanism 410 comprises a second solenoid 412 fixed onto the first side plate 132 as a driving source, a push bar 418 connected to the second solenoid 412, a link member 420 for transmitting the driving force of the second solenoid 412 (which is transmitted by way of the push bar 418) to the distributing member 400, and a driven member 422 formed on the distributing member 400 and connected to the link member 420.

The second solenoid 412 comprises a frame in which a coil (not shown) and a stationary core (not shown) are held, a plunger 414 movably installed in the frame, and a spring 416 that urges the plunger 414 in the direction protruding from the frame. If the second solenoid 412 is energized, the plunger 414 is attracted to the inside of the frame against the urging force of the spring 416. If the second solenoid 412 is de-energized, the plunger 414 is protruded from the frame by the urging force of the spring 416. In this way, a so-called pull-type solenoid whose plunger is reciprocated is used as the second solenoid 412. The second solenoid 412 is placed in such a way that the plunger 414 is reciprocated approximately along the X axis and is fixed to the first side plate 132 by way of a bracket.

The push bar 418, which is approximately linear in shape, is placed in the direction along which the plunger 414 is reciprocated (i.e., approximately along the X axis). One end of the push bar 418 is connected to the protruded portion of the plunger 414 from the frame. Thus, the push bar 418 is reciprocated approximately along the X axis in synchronization with the reciprocation motion of the plunger 414. On the other hand, the link member 420 is connected to the opposite end of the push bar 418 to the end connected to the plunger 414 and therefore, the driving force of the second solenoid 412 is transmitted to the link member 420 by way of the push bar 418.

The link member 420, which is formed by a plate-shaped member having a plan shape of approximately an obtuse-angled triangle, is rockably engaged with the first side plate 132 in such a way as to be rocked around the inner center. The push bar 418 is rockably connected to one of the pair of vertexes of the link member 420 which includes an acute angle. A roller is attached to the opposite end of the link member 420 to the end to which the push bar 418 is connected. The link member 420 is engaged with the driven member 422 formed on the distributing member 400 by way of the roller. By this structure, the driving force of the second solenoid 412 is transmitted to the driven member 422 by way of the push bar 418 and the link member 420.

The driven member 422 is provided at the end of the sidewall of the distributing member 400, which is closer to the recovery passage 404 (see FIG. 3). The driven member 422, the cross section of which is approximately L-shaped, comprises a first protrusion part protruding along the Y axis from the sidewall, a second protrusion part protruding along the Z axis to be perpendicular to the first protrusion part from one end of the first protrusion part, and a through hole formed in the second protrusion part. The through hole is formed like a shallow V character. The apex of the through hole is shifted toward the first card insertion section 102 from the middle of the through hole. The through hole is parallel to the X-Z plane. The roller of the link member 420 is inserted into the through hole and engaged with the same in such a way that the roller can be reciprocated in the through hole.

Next, the operation of the distributing section 106 will be explained below in detail.

When the second solenoid 412 is in the standby state, i.e., de-energized, the plunger 414 is protruded from the frame of the solenoid 412 by the urging force of the spring 416. The push bar 418 is pressed along the X axis by the plunger 414 thus protruded, thereby pressing the near end of the link member 420 backward along the X axis. The link member 420 is rocked or pivoted around its inner center in the second rotation direction R2 in conjunction with the backward movement of the near end of the link member 420 along the X axis. In conjunction with the rocking or pivoting motion of the link member 420 in the second rotation direction R2, the remote end of the link member 420 is moved forward along the X axis. As a result, the distributing member 400 is moved to the third position P3.

If the second solenoid 412 is energized, the plunger 414 is attracted to the inside of the frame of the solenoid 412 against the urging force of the spring 416. In other words, the plunger 414 is moved forward. In conjunction with this movement of the plunger 414, the push bar 418 is moved forward and the near end of the link member 420 also is moved forward. By these movements, the link member 420 is rocked or pivoted around its inner center in the first rotation direction R1 and the remote end of the link member 420 is moved backward. As a result, the distributing member 400 is moved to the fourth position P4 from the third position P3.

Figure 4:
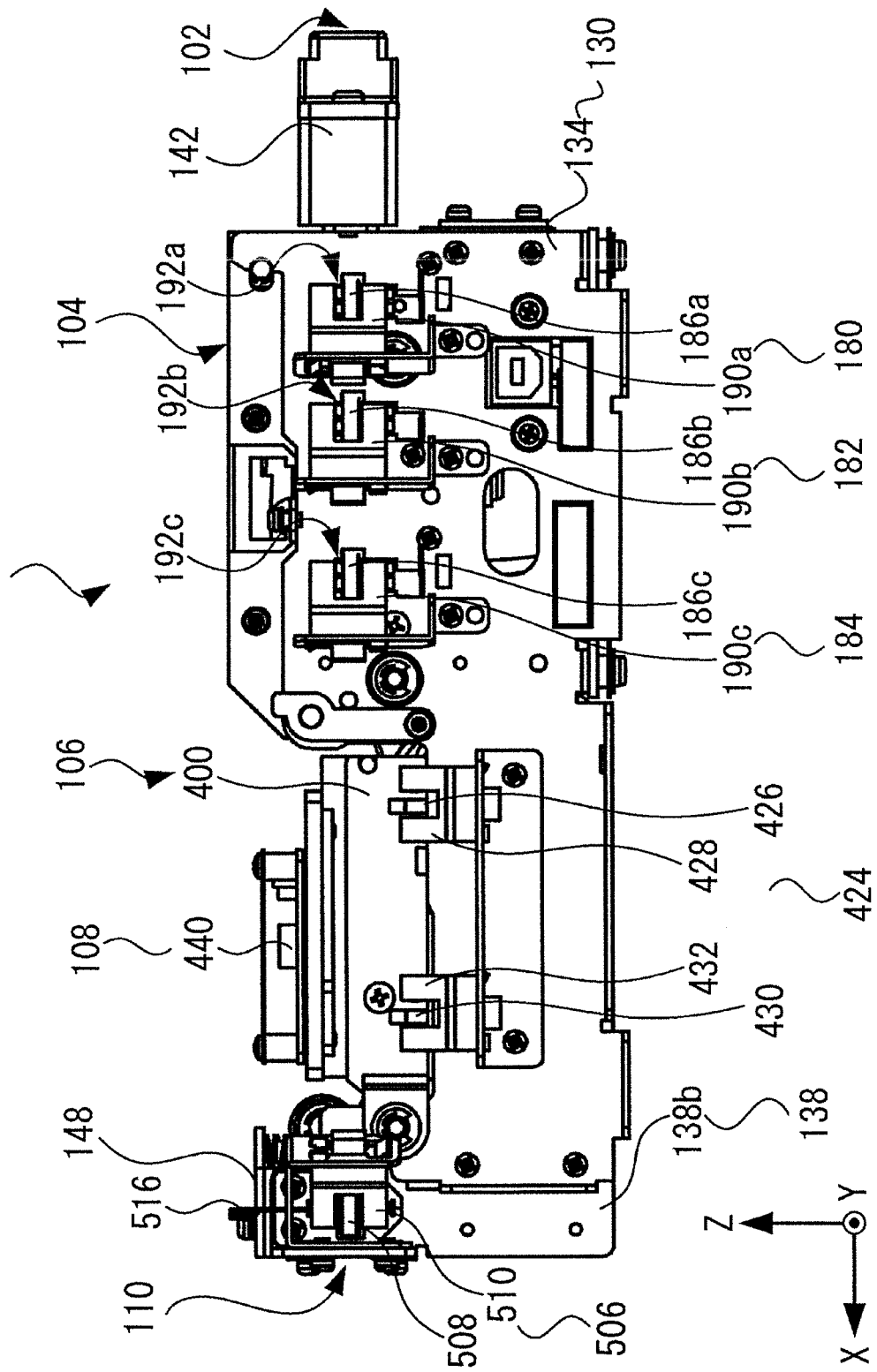
FIG. 4 is a left side view of the card processing apparatus of FIG. 1.
Figure 5:
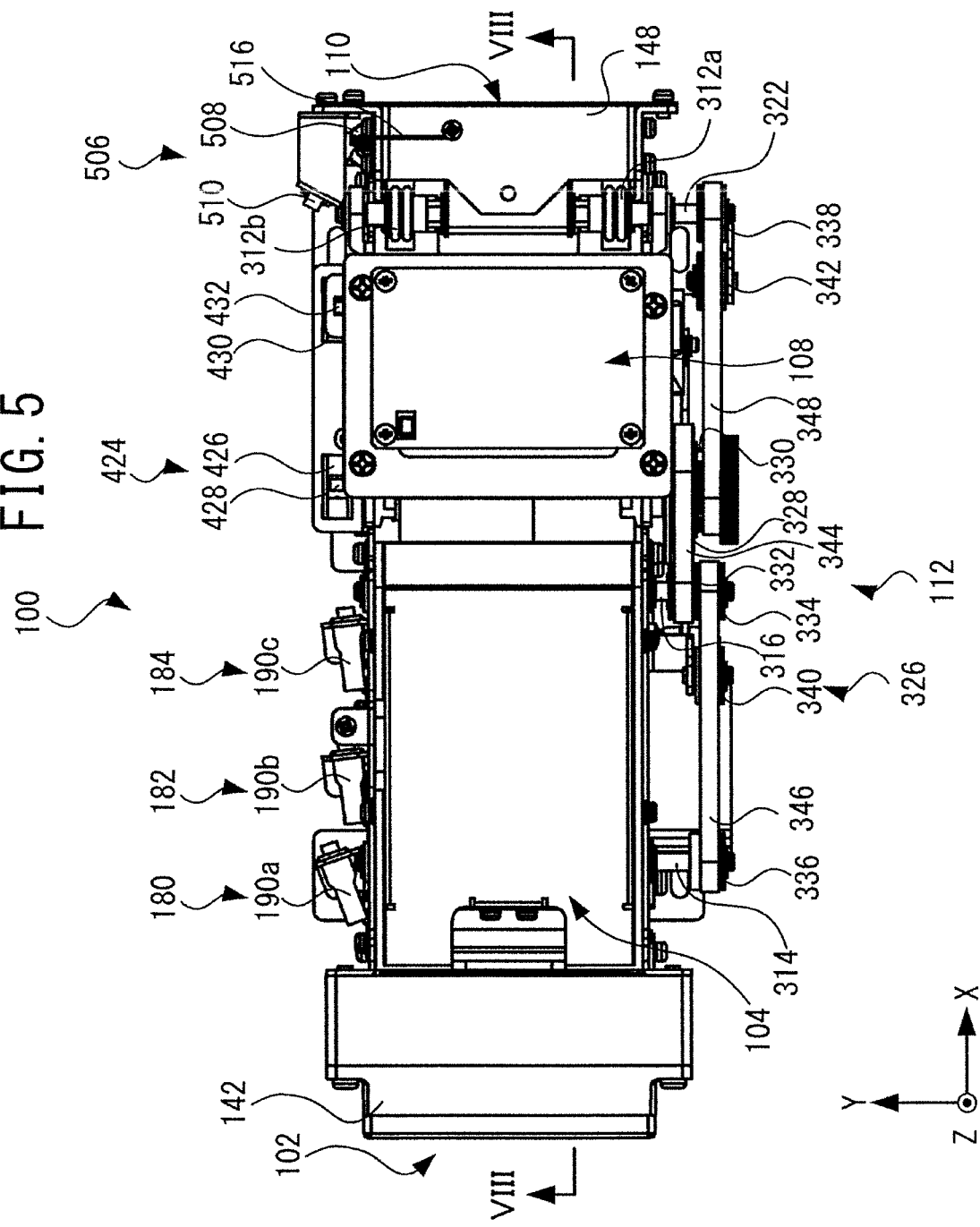
FIG. 5 is a plan view of the card processing apparatus of FIG. 1.

On the second side plate 134 of the frame 130, as shown in FIGS. 2 and 4, the state detecting section 424 for detecting which one of the third and fourth positions P3 and P4 the distributing member 400 is located at is provided. The state detecting section 424 comprises a pair of detected parts 428 and 432, and a pair of sensors 426 and 430 for respectively detecting the detected parts 428 and 432. The detected parts 428 and 432 are respectively formed by plate-shaped members which protrude from the sidewall of the distributing member 400 along the Y axis. As the pair of the sensors 426 and 430, thin transmission-type photosensors are used. Each of the photosensors has a U-shaped body, and a pair of a light projector and a light receiver placed respectively at the two ends of the body so as to be opposite to each other. The pair of the sensors 426 and 430 protrudes from the second side plate 134 along the Y axis and is fixed on the bracket extending along the X axis. The sensor 426 is located at the position corresponding to the detected part 428, and the sensor 430 is located at the position corresponding to the detected part 432.

The detected parts 428 and 432 are configured in such a way as to be inserted respectively into the grooves of the sensors 426 and 430 when the distributing member 400 is located at the third position P3. For this reason, when the distributing member 400 is located at the third position P3, the optical axis from the light projector to the light receiver for each of the sensors 426 and 430 is blocked by a corresponding one of the detected parts 428 and 432 and as a result, the amounts of the light received by the light receivers decrease. On the other hand, the detected parts 428 and 432 are configured in such a way as to be respectively pulled out from the grooves of the sensors 426 and 430 when the distributing member 400 is located at the fourth position P4. For this reason, when the distributing member 400 is located at the fourth position P4, the optical axis from the light projector to the light receiver for each of the sensors 426 and 430 is not blocked by a corresponding one of the detected parts 428 and 432 and as a result, the amounts of the light received by the light receivers increase compared with the amounts at the third position P3. Therefore, by detecting the change of the amounts of the light received by the light receivers of the sensors 426 and 430, which one of the third and fourth positions P3 and P4 the distributing section 106 is located at can be detected.

[Second Card Insertion Section]

Next, the second card insertion section 110 will be explained below with reference to FIGS. 1 to 10.

As clearly shown in FIG. 2, the second card insertion section 110 is provided at the opposite end of the conveying path 118 to the first card insertion section 102. The second card insertion section 110 is configured to communicate with a card dispensing apparatus (not shown) for receiving a plurality of cards 120 and dispensing the cards 120 one by one or the like, and has the function of guiding the card 120 thus dispensed from the card dispensing apparatus to the conveying path 118.

The second card insertion section 110 is placed over the second stay 138. The section 110 comprises a first member 500 and a second member 502 which are opposed to each other at an interval slightly larger than the thickness of a card 120, and a fourth card detector 506 for detecting a card 120 inserted through the second card insertion hole 110*a*.

The first member 500 comprises an approximately rectangular stay portion 500*a*, an approximately rectangular guide portion 500*b* which is perpendicular to the stay portion 500*a* and which has a pair of long sides parallel to the pair of long sides of the stay portion 500*a*, a taper portion 500*c* that connects one of the pair of long sides of the stay portion 500*a* to one of the pair of long sides of the guide portion 500*b*, and a taper portion 500*d* formed to be continuous with the remaining long side of the guide portion 500*b*, as shown in FIGS. 2, 8, and 9. The second member 502 has the same structure as the first member 500 and comprises a stay portion 502*a*, a guide portion 502*b*, and taper portions 502*c* and 502*d*. The second member 502 is located below the first member 500. The guide portion 500*b* of the first member 500 and the guide portion 502*b* of the second member 502 are opposed to each other in such a way that the interval between the guide portions 500*b* and 502*b* is slightly larger than the thickness of a card 120.

In the flange part 138*b* of the second stay 138, a rectangular through hole is formed in such a way as to be approximately the same in height as that of a gap 518 (see FIG. 12) formed between the guide portions 500*b* and 502*b*. A roller 508 of the fourth card detector 506 which will be explained later in detail is located in this through hole. The length of this through hole along the X axis is larger than the diameter of the roller 508 and the length of this through hole along the Z axis is larger than the thickness of the roller 508.

The fourth card detector 506 basically has the same structure as that of the first, second, and third card detectors 180, 182, and 184, which comprises the aforementioned roller 508, a sensor 510, and a wire or torsion spring 516. The roller 508 is formed by a circular plate-shaped or cylindrical rotator and has a shaft hole 508*a* formed at the centers of the top and bottom circular surfaces. A first shaft 518*a* of the wire spring 516 is inserted into the shaft hole 508*a*, making the roller 508 rotatable around the first shaft 518*a*. The wire spring 516 comprises a second shaft 518*b* in addition to the first shaft 518*a*, in which the first and second shafts 518*a* and 518*b* form an L-like shape. The first shaft 518*a* extends along the Z axis and the second shaft 518*b* is fixed to the fourth stay 148 with a screw or the like. The roller 508 is located in the through hole 504 and urged toward the gap 518 by the spring 516 and thus, the roller 508 can be moved into and moved out of the inside of the second card insertion section 110. When the roller 508 is located at the standby position P5d, the minimum interval between the side face of the roller 508 and the flange part 138a of the second stay 138 is set to be smaller than the pair of short sides of a card 120.

As the sensor 510, a thin transmission-type photosensor which has an approximately U-shaped body with a groove 512, and a pair of light projector and a light receiver located to be opposite to each other at the two ends of the body is used. The sensor 510 is fixed to the flange part 138b of the second stay 138 by way of a bracket which is provided corresponding to the groove 512 on the opposite side of the second card insertion hole 110a, in other words, in the outside of the second side plate 134. The optical axis 514 of the light which is emitted from the light projector to the light receiver is parallel to the Z axis. The roller 508 can be moved into the groove 512. The sensor 510 is placed in such a way that the optical axis 514 of the sensor 510 is not blocked by the roller 508 in the normal state, and that if the roller 508 is moved out of the first conveying path 150, the optical axis 514 is blocked.

As described previously, the minimum interval between the side face of the roller 508 and the flange part 138a of the second stay 138 is set to be smaller than the pair of short sizes of a card 120 and thus, the roller 508 can be contacted with the side edge of a card 120 and pressed along the Y axis to be moved out of the second card insertion hole 110a. Accordingly, when a card 120 reaches the fourth card detector 506, the roller 508 is pressed by the side edge of the card 120 along the Y axis and as a result, the roller 508 enters in the groove 512 of the sensor 510 to thereby block the optical axis 514. When the optical axis 514 is blocked by the roller 508, the sensor 510 outputs a fourth detection signal SS4 toward the control section 146. When the fourth detection signal SS4 is inputted into the control section 146, the control section 146 judges that a card 120 is detected by the fourth card detector 506. This means that the card 120 is detected indirectly by the sensor 510 by way of the roller 508. Therefore, even if the card 120 is a skeleton card having transparency in its entirety, there arises no malfunction that the card 120 is unable to be detected by the fourth card detector 506.

In addition, the second card insertion section 110 in this first embodiment comprises the first and second members 500 and 502; however, the present invention is not limited to this. The second card insertion section 110 may be formed by a columnar member having an approximately rectangular though hole which is slightly larger than a card 120. Moreover, an approximately rectangular though hole slightly larger than a card 120. may be formed in a plate-shaped stay that connects the first and second side plates 132 and 134.

[Conveying Mechanism]

Next, the conveying mechanism 112 will be explained below with reference to FIGS. 1, 3, 5 to 9, and 12.

The conveying mechanism 112 has the function of conveying a card 120 placed on the conveying path 118 forward and backward along the X axis. The conveying mechanism 112 comprises a motor 300 for driving the conveying mechanism 112; the first and third conveying roller devices 302 and 306 which are opposed to each other, the second and fourth conveying roller devices 304 and 308 which are opposed to each other, and the fifth and sixth conveying roller devices 310 and 312 which are opposed to each other for conveying cards 120 while sandwiching them, respectively; and the drivably connecting section 326 for transmitting the driving force of the motor 300 to the first to sixth conveying roller devices 302, 304, 306, 308, 310 and 312, as shown in FIG. 8.

The motor 300 is located between the first and second side plates 132 and 134, in other words, in the inside of the frame 130, where the rotation shaft of the motor 300 is parallel to the Y axis. The end of the shaft is protruded along the Y axis from the through hole formed in the first side plate 132.

The first conveying roller device 302 comprises the pair of rollers 302a and 302b, and a first rotation shaft 314 to which the rollers 302a and 302b are fixed coaxially. The rollers 302a and 302b are fixed to the first rotation shaft 314 at the two ends (two sides) of the conveying path 118 in the Y direction, respectively. The first rotation axis 314 is located in parallel to the Y axis, and the opposite end of the shaft 314 to that to which the roller 302a is fixed is protruded along the Y axis toward the outside of the conveying path 118 through the through hole formed in the first side plate 132.

Each of the second and fifth conveying roller devices 304 and 310 has a similar structure to the first conveying roller device 302.

The second conveying roller device 304 comprises the pair of rollers 304a and 304b, and a second rotation shaft 316 to which the rollers 304a and 304b are fixed coaxially. The rollers 304a and 304b are fixed to the second rotation shaft 316 at the two ends (on the two sides) of the conveying path 118 in the Y direction, respectively. The second rotation axis 316 is located in parallel to the Y axis, and the opposite end of the shaft 316 to that to which the roller 304a is fixed is protruded along the Y axis toward the outside of the conveying path 118 through the through hole formed in the first side plate 132.

The fifth conveying roller device 310 comprises a pair of rollers 310a and 310b, and a fifth rotation shaft 322 to which the rollers 310a and 310b are fixed coaxially. The rollers 310a and 310b are fixed to the fifth rotation shaft 322 at the two ends (on the two sides) of the conveying path 118 in the Y direction, respectively. The fifth rotation shaft 322 is located in parallel to the Y axis, and the opposite end of the shaft 322 to that to which the roller 310a is fixed is protruded along the Y axis toward the outside of the conveying path 118 from the through hole formed in the first side plate 132.

The third, fourth, and sixth conveying roller devices 306, 308, and 312 are respectively located at the positions over the first, second, and fifth conveying roller devices 302, 304, and 310 in such a way as to be opposite to these conveying roller devices 302, 3048, and 310. Moreover, the third, fourth, and sixth conveying roller devices 306, 308, and 312 are respectively urged toward the first, second, and fifth conveying roller devices 302, 304, and 310.

The pair of rollers 306a and 306b of the third conveying roller device 306 is located to be opposed to the pair of rollers 302a and 302b of the first conveying roller device 302 at the positions over the first conveying roller device 302. The rollers 306a and 306b are respectively fixed to the two ends of the third rotation shaft 318 which is parallel to the Y axis. Similar to the third conveying roller device 306, the pair of rollers 308a and 308b of the fourth conveying roller device 308 is located to be opposed to the pair of rollers 304a and 304b of the second conveying roller device 304 at the positions over the second conveying roller device 304. The rollers 308a and 308b are respectively fixed to the two ends of the fourth rotation shaft 320 which is parallel to the Y axis. Similar to the third and fourth conveying roller devices 306 and 308, the pair of rollers 312a and 312b of the sixth conveying roller device 312 is located to be opposed to the pair of rollers 310a and 310b of the fifth conveying roller device 310 at the positions over the fifth conveying roller device 310. The rollers 312a and 312b are respectively fixed to the two ends of the sixth rotation shaft 324 which is parallel to the Y axis.

As described above, the first and third conveying roller devices 302 and 306 are opposed to each other, the second and fourth conveying roller devices 304 and 308 are opposed to each other, and the fifth and sixth conveying roller devices 302 and 306 are opposed to each other. Moreover, the third, fourth, and sixth conveying roller devices 306, 308, and 312 are respectively urged toward the first, second, and fifth conveying roller devices 302, 304, and 306. Therefore, a card 120 will be sandwiched between the first and third conveying roller devices 302 and 306, between the second and fourth conveying roller devices 304 and 308, and between the fifth and sixth conveying roller devices 310 and 312.

The drivably connecting section 326 comprises first, second, third, fourth, fifth, sixth, seventh, and eighth gears 328, 330, 332, 334, 336, 338, 340, and 342, and first, second, and third endless belts 344, 346, and 348 for transmitting the driving force of the motor 300 to the first to eighth gears 328, 330, 332, 334, 336, 338, 340, and 342. The first to eighth gears 328, 330, 332, 334, 336, 338, 340, and 342 and the first to third belts 344, 346, and 348 are placed outside of the first side plate 132. The first and second gears 328 and 330 are fixed to the rotation shaft of the motor 300. The third and fourth gears 332 and 334 are fixed to the second rotation shaft 316 of the second conveying roller device 304. The fifth gear 336 is fixed to the first rotation shaft 314 of the first conveying roller device 302. The sixth gear 338 is fixed to the fifth rotation shaft 322 of the fifth conveying roller device 310. In this way, the drivably connecting section 326 is configured in such a way that the first and second gears 328 and 330 are rotated by the rotation shaft of the motor 300, that the rollers 304a and 304b of the second conveying roller device 304 are rotated by the third and fourth gears 332 and 334, that the rollers 302a and 302b of the first conveying roller device 302 are rotated by the fifth gear 336, and that the rollers 310a and 310b of the fifth conveying roller device 310 are rotated by the sixth gear 338.

The first endless belt 344 is stretched between the first and third gears 328 and 332. Teeth for engagement with the teeth of the first and third gears 328 and 332 are formed on the inner surface of the first belt 344 around its approximately whole circumference. If the motor 300 is activated and the first gear 328 is rotated, the driving force of the motor 300 is transmitted to the first belt 344 and as a result, the first belt 344 travels. If the first belt 344 travels, the driving force of the first belt 344 is transmitted to the third gear 332 and as a result, the third gear 332 which is fixed to the second shaft 316 of the second conveying roller device 304 rotates. In this way, the driving force of the motor 300 is transmitted to the second shaft 316 by way of the first gear 328, the first belt 344, and the third gear 332, thereby rotating the second shaft 316. In accordance with the rotation of the second shaft 316, the fourth gear 334 and the rollers 304a and 304b of the second conveying roller device 304 rotate; this is because the fourth gear 334 and the rollers 304a and 304b are fixed to the second shaft 316.

The second endless belt 346 is stretched between the fourth and fifth gears 334 and 336. Similar to the first belt 344, teeth for engagement with the teeth of the fourth and fifth gears 334 and 336 are formed on the inner surface of the second belt 346 around its approximately whole circumference. If the fourth gear 334 is rotated, the driving force of the fourth gear 334 is transmitted to the second belt 346 and as a result, the second belt 346 travels. If the second belt 346 travels, the driving force of the second belt 346 is transmitted to the fifth gear 336 and as a result, the fifth gear 336 which is fixed to the first shaft 314 of the first conveying roller device 302 rotates. In this way, the driving force of the motor 300 is transmitted to the first shaft 314 by way of the first gear 328, the first belt 344, the third gear 332, the fourth gear 334, the second belt 346, and the fifth gear 336, thereby rotating the first shaft 314. In accordance with the rotation of the first shaft 314, the rollers 302a and 302b of the first conveying roller device 302 rotate; this is because the rollers 302a and 302b are fixed to the first shaft 314.

The third endless belt 348 is stretched between the second and sixth gears 330 and 338. Similar to the first belt 344, teeth for engagement with the teeth of the second and sixth gears 330 and 338 are formed on the inner surface of the third belt 348 around its approximately whole circumference. If the motor 300 is activated and the second gear 304 is rotated, the driving force of the second gear 330 is transmitted to the third belt 348 and as a result, the third belt 348 travels. If the third belt 348 travels, the driving force of the third belt 348 is transmitted to the sixth gear 338 and as a result, the sixth gear 338 which is fixed to the fifth shaft 322 of the fifth conveying roller device 310 rotates. In this way, the driving force of the motor 300 is transmitted to the fifth shaft 322 by way of the second gear 330, the third belt 348, and the sixth gear 338, thereby rotating the fifth shaft 322. In accordance with the rotation of the fifth shaft 322, the rollers 310a and 310b of the fifth conveying roller device 310 rotate; this is because the rollers 310a and 310b are fixed to the fifth shaft 322.

The seventh gear 340 is located in the inside of the second belt 346, and the eighth gear 342 is located in the inside of the third belt 348. The seventh and eighth gears 340 and 342 have the functions of adjusting the tensions of the second and third belts 346 and 348, respectively. The seventh and eighth gears 340 and 342 are held by the first side plate 132 so as to be movable along the Z axis. The seventh and eighth gears 340 and 342 are respectively configured to be moved upward or downward along the Z axis in accordance with the increase or decrease of the tensions of the second and third belts 346 and 348. Accordingly, idle rotation of the drivably connecting section 326 can be prevented by adjusting the tensions of the first and second belts 344 and 346 through the positional displacements of the seventh and eighth gears 340 and 342.

In addition, in the card processing apparatus 100 according to this first embodiment, the drivably connecting section 326 comprises the first to eighth gears 328, 330, 332, 334, 336, 338, 340, and 342, and the first to third belts 344, 346, and 348; however, the present invention is not limited to this. For example, the drivable connections among the rotation shaft of the motor 300, the first shaft 314, the second shaft 316, and the fifth shaft 324 may be formed by using bevel gears and shafts. Moreover, the first to eighth gears 328, 330, 332, 334, 336, 338, 340, and 342 may be replaced with rollers, and these rollers may be drivably connected with endless belts without teeth.

[Control Section]

The control section 146 of the card processing apparatus 100 has the following structure. Specifically, the control section 146 comprises a microcomputer including a MPU, a RAM, and a ROM and is operated in response to the instructions sent from the external device 1. The control section 146 controls the magnetic head 244, the antenna 440, the first and second solenoids 232 and 412, and the motor 300. Moreover, the control section 146 controls the conveyance of a card 120 in the conveying path 118 in response to the output signals from the first to fourth card detectors 180, 182, 184, and 506.

[Card Conveyance Control]

Next, the card conveyance control by the control section 146 of the card processing apparatus 100 will be explained with reference to FIGS. 14 to 22.

In the following description, the conveyance control of a card 120 which is relevant to the present invention will be mainly explained, and the explanation about the reading and writing processes of magnetic data and IC data with respect to the magnetic stripe and the IC chip built in a card 120 will be omitted, because these processes are well known.

First, the case where a card 120 is introduced into the card processing apparatus 100 by way of the first card insertion hole 102 will be explained with reference to FIGS. 14A to 14D, 15A to 15C, and 20.

If the card processing apparatus 100 is in the standby state, as shown in FIG. 14A, the rollers 186a, 186b, 186c, and 508 of the first to fourth card detectors 180, 182, 184, and 506 are respectively kept at their standby positions P5a, P5b, P5c, and P5d at which the rollers 186a, 186b, 186c, 508 do not block the optical axes 194a, 194b, 194c, and 514 of the sensors 190a, 190b, 190c, and 510, respectively.

If a card 120 is inserted into the card processing apparatus 100 through the first card insertion hole 102a when the apparatus 100 is in the standby state, the roller 186a of the first card detector 180 is pressed by an opposing edge of the card 120 and moved toward the outside along the Y axis. As a result, the roller 186a is shifted to the shifted position P6a and blocks the optical axis 194a of the sensor 190a of the first card detector 180, as shown in FIG. 14B. In other words, the first card detector 180 is shifted to the ON state (see Step S1 in FIG. 20). In this way, the first card detector 180 detects the card 120 thus inserted and outputs a first detection signal SS1 to the control section 146. When the first detection signal SS1 is inputted, in other words, the first detection signal SS1 is a signal notifying that a card is detected, the control section 146 judges that the card 120 has been inserted and outputs a first driving control signal DS1. In response to the first driving control signal DS1, the motor 300 is driven forward and the first, second, and fifth conveying roller devices 302, 304, and 310 are operated or rotated in the direction for conveying the card 120 backward (i.e., in the forward rotation direction) (see Step S2 in FIG. 20). As a result, the card 120 is conveyed backward along the X axis.

When the card 120 is conveyed backward to the second card detector 182, the roller 186b of the second card detector 182 is pressed outward by an opposing edge of the card 120 along the Y axis. As a result, the roller 186b is shifted to the shifted position P6b and blocks the optical axis 194b of the sensor 190b of the second card detector 182, as shown in FIG. 14C. In other words, the second card detector 182 is shifted to the ON state (see Step S3 in FIG. 20). In this way, the second card detector 182 detects the card 120 thus inserted and outputs a second detection signal SS2 toward the control section 146. It may be said that the second detection signal SS1 is a signal notifying that a card is detected. At this time, the first card detector 180 is kept detecting the card 120 and thus, the output of the first detection signal SS1 continues. Accordingly, the first and second detection signals SS1 and SS2 are inputted into the control section 146 at this stage.

When the card 120 is conveyed backward to the third card detector 184, the roller 186c of the third card detector 184 is pressed outward by an opposing edge of the card 120 along the Y axis. As a result, the roller 186c is shifted to the shifted position P6c and blocks the optical axis 194c of the sensor 190c of the third card detector 184, as shown in FIG. 14D. In other words, the third card detector 184 is shifted to the ON state (see Step S4 in FIG. 20). In this way, the third card detector 184 detects the card 120 thus inserted and outputs a third detection signal SS3 toward the control section 146. It may be said that the third detection signal SS3 is a signal notifying that a card is detected. At this time, the first and second card detectors 180 and 182 are kept detecting the card 120 and thus, the outputs of the first and second detection signals SS1 and SS2 continue. Accordingly, the first, second, and third detection signals SS1, SS2, and SS3 are inputted into the control section 146 at this stage.

Figure 15A:
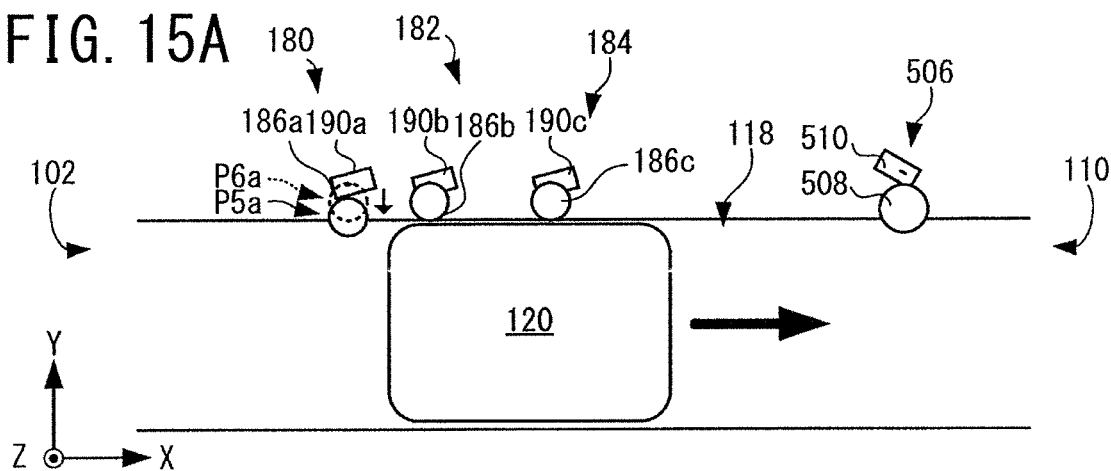
FIGS. 15A to 15C are schematic views showing the card conveying state of the card processing apparatus of FIG. 1, respectively, where the card is introduced into the apparatus through the first card insertion hole.

When the card 120 is conveyed backward furthermore and the front end of the card 120 is moved to a position which is shifted backward with respect to the first card detector 180, the roller 186a of the first card detector 180 is detached from the opposing edge of the card 120 and the pressing state of the roller 186a by the card 120 is released. As a result, the roller 186a is shifted to the standby position P5a at which the roller 186a does not block the optical axis 194a of the sensor 190a, as shown in FIG. 15A. In other words, the first card detector 180 is shifted or returned to the OFF state (see Step S5 in FIG. 20). In this state, the first card detector 180 does not already detect the card 120 and the output of the first detection signal SS1 is stopped. It may be said that the first detection signal SS1 is a signal notifying that a card is not detected. At this time, the second and third card detectors 182 and 184 are kept detecting the card 120 and thus, the output of the second and third detection signals SS2 and SS3 continues. Accordingly, the input of the first detection signal SS1 into the control section 146 is stopped and the input of the second and third detection signals SS2 and SS3 into the control section 146 continues at this stage.

Figure 15B:
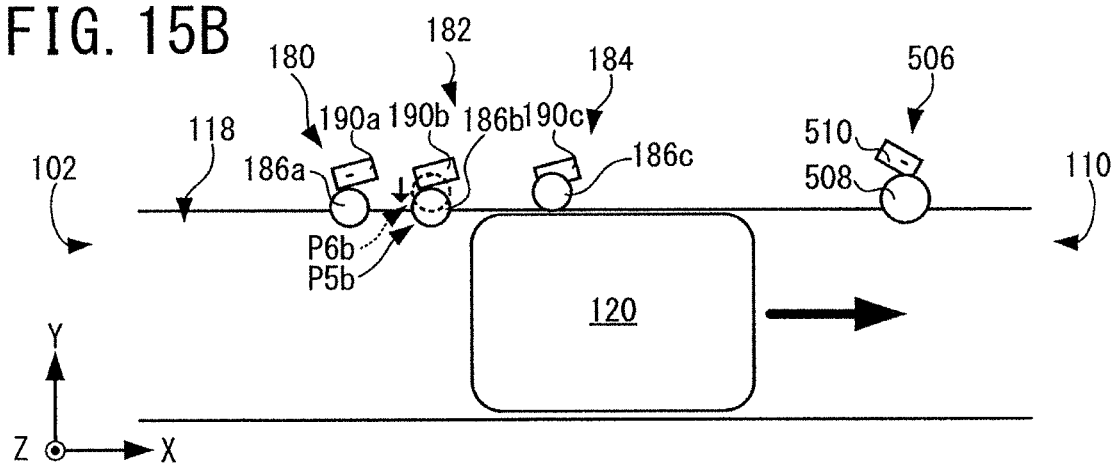

When the card 120 is conveyed backward furthermore and the front end of the card 120 is moved to a position which is shifted backward with respect to the second card detector 182, the roller 186b of the second card detector 182 is detached from the opposing edge of the card 120 and the pressing state of the roller 186b by the card 120 is released. As a result, the roller 186b is shifted to the standby position P5b at which the roller 186b does not block the optical axis 194b of the sensor 190b, as shown in FIG. 15B. In other words, the second card detector 182 is shifted or returned to the OFF state (see Step S6 in FIG. 20). In this state, the second card detector 182 does not already detect the card 120 and the output of the second detection signal SS2 is stopped. It may be said that the second detection signal SS2 is a signal notifying that a card is not detected. At this time, the third card detector 184 is kept detecting the card 120 and thus, the output of the third detection signal SS3 continues. Accordingly, the input of the second detection signal SS2 into the control section 146 is stopped and the input of the third detection signal SS3 into the control section 146 continues at this stage.

Figure 15C:
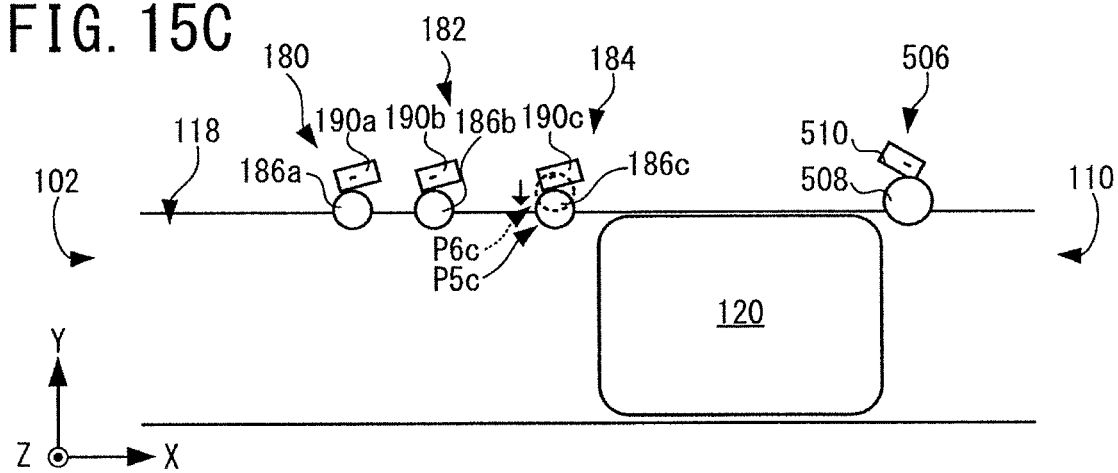

When the card 120 is conveyed backward furthermore and the front end of the card 120 is moved to a position which is shifted backward with respect to the third card detector 184, the roller 186c of the third card detector 184 is detached from the opposing edge of the card 120 and the pressing state of the roller 186c by the card 120 is released. As a result, the roller 186c is shifted to the standby position P5c at which the roller 186c does not block the optical axis 194*c* of the sensor 190*c*, as shown in FIG. 15C. In other words, the third card detector 184 is shifted or returned to the OFF state (see Step S7 in FIG. 20). In this state, the third card detector 184 does not already detect the card 120 and the output of the third detection signal SS3 is stopped. It may be said that the third detection signal SS3 is a signal notifying that a card is not detected. When none of the first, second, and third detection signals SS1, SS2, and SS3 is inputted into the control section 146, in other words, all of the first to third detection signals SS1, SS2, and SS3 are signals notifying that a card is not detected, the control section 146 judges that the backward conveyance of the card 120 is completed and then, stops the output of the first driving control signal DS1 to stop the driving of the motor 300 (see Step S8 in FIG. 20). In this way, the introducing process of the card 120 into the card processing apparatus 100, where the card 120 has been inserted through the first card insertion hole 102*a*, is completed.

Next, the case where a card 120 is introduced into the card processing apparatus 100 by way of the second card insertion hole 110*a* will be explained in detail with reference to FIGS. 16A to 16D.

If a card 120 is inserted into the card processing apparatus 100 by way of the second card insertion hole 110*a* when the card processing apparatus 100 is in the standby state (see FIG. 16A), the roller 508 of the fourth card detector 506 is pressed by an opposing edge of the card 120 and moved toward the outside along the Y axis, as shown in FIG. 16B. As a result, the roller 508 is shifted to the shifted position P6*d* and blocks the optical axis 514 of the sensor 510 of the fourth card detector 506. In other words, the fourth card detector 506 is shifted to the ON state (see Step S11 in FIG. 21). In this way, the fourth card detector 506 detects the card 120 thus inserted and outputs a fourth detection signal SS4 to the control section 146. It may be said that the fourth detection signal SS4 is a signal notifying that a card is detected. When the fourth detection signal SS4 is inputted, the control section 146 judges that the card 120 has been inserted through the second card insertion hole 110*a* and outputs a second driving control signal DS2 to the control section 146. In response to the second driving control signal DS2, the motor 300 is driven reverse and as a result, the first, second, and fifth conveying roller devices 302, 304, and 310 are rotated in the direction for conveying the card 120 forward (i.e., in the reverse rotation direction of the motor 300) (see Step S12 in FIG. 21). In this way, the card 120 is conveyed forward along the X axis.

When the card 120 is conveyed forward furthermore and the front end of the card 120 is moved to a position which is shifted forward with respect to the fourth card detector 506, the roller 508 of the fourth card detector 506 is detached from the opposing edge of the card 120 and the pressing state of the roller 508 by the card 120 is released. As a result, the roller 508 is shifted to the standby position P5*d* at which the roller 508 does not block the optical axis 514 of the sensor 510, as shown in FIG. 16C. In other words, the fourth card detector 506 is shifted or returned to the OFF state (see Step S13 in FIG. 21). In this state, the fourth card detector 506 does not already detect the card 120 and the output of the fourth detection signal SS4 is stopped and thus, the input of the fourth detection signal SS4 into the control section 146 is stopped. In other words, the fourth detection signal SS4 is a signal notifying that a card is not detected.

Figure 21:
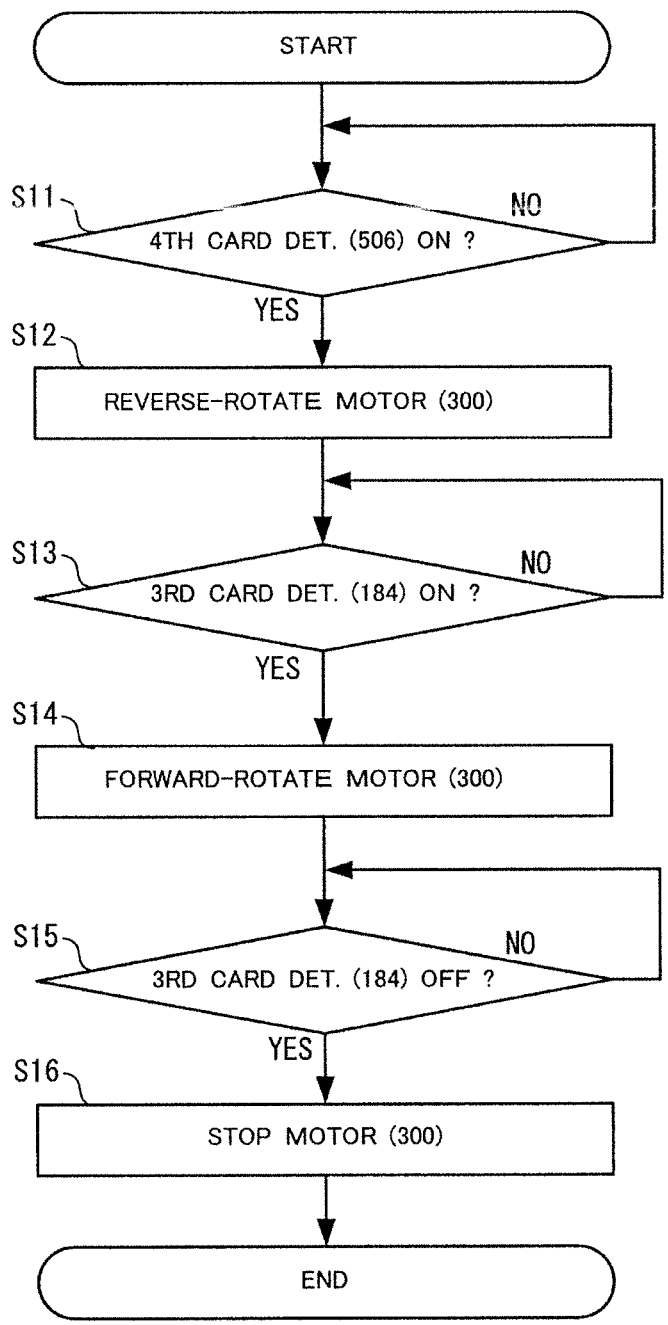
FIG. 21 is a flow chart showing the card conveying control of the card processing apparatus of FIG. 1, where the card is introduced into the apparatus through the second card insertion hole.

When the card 120 is conveyed forward furthermore and moved to the third card detector 184, as shown in FIG. 16C, the third card detector 184 is shifted to the ON state (see Step S13 in FIG. 21). In this way, the third card detector 184 detects the card 120 thus inserted and outputs a third detection signal SS3 to the control section 146. In other words, the third detection signal SS3 is a signal notifying that a card is detected. When the third detection signal SS3 is inputted, the control section 146 judged that the card 120 has been conveyed to the IC data reading/writing section 108 and outputs a first driving control signal DS1. In response to the first driving control signal DS1, the reverse rotation of the motor 300 is switched to the forward rotation to thereby convey the card 120 backward (see Step S14 in FIG. 21).

When the front end of the card 120 is moved to a position which is shifted backward with respect to the third card detector 184, as shown in FIG. 16D, the third card detector 184 is shifted or returned to the OFF state (see Step S15 in FIG. 21). In this state, the third card detector 180 does not already detect the card 120 and the output of the third detection signal SS3 is stopped. In other words, the third detection signal SS3 is a signal notifying that a card is not detected. When the input of the third detection signal SS3 is stopped, the control section 146 judged that the conveyance of the card 120 has been completed and stops the output of the first driving control signal DS1 to thereby stop the driving of the motor 300 (see Step S16 in FIG. 21). In this way, the introducing process of the card 120 into the card processing apparatus 100, where the card 120 has been inserted through the second card insertion hole 110*a*, is completed.

Next, the ejecting process of a card 120 which has been introduced into the card processing apparatus 100 will be explained with reference to FIGS. 17A to 17D and FIGS. 18A and 18B.

Figure 17A:
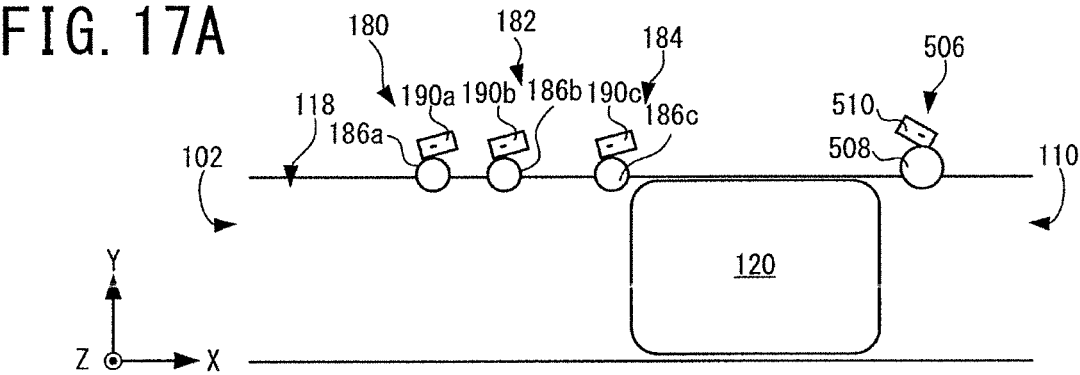
FIGS. 17A to 17D are schematic views showing the card conveying state of the card processing apparatus of FIG. 1, respectively, where the card is ejected through the first card insertion hole from the inside of the apparatus.

As shown in FIG. 17A, the card 120 which has been completely introduced into the card processing apparatus 100 is kept on the conveying path 118 between the third card detector 184 and the fourth card detector 506 in the non-detection state where none of the first to fourth card detectors 180, 182, 184, ad 506 detects the card 120. When the card ejecting process of the card processing apparatus 100 is performed, the control section 146 outputs a second driving control signal DS2. In response to the second driving control signal DS2, the motor 300 is reverse-rotated and as a result, the rollers 302*a* and 302*b*, 304*a* and 304*b*, and 310*a* and 310*b* of the first, second, and fifth conveying roller devices 302, 304 and 310 are reverse-rotated (see Step 21 in FIG. 22). In this way, the forward conveyance of the card 120 is started.

Figure 17B:
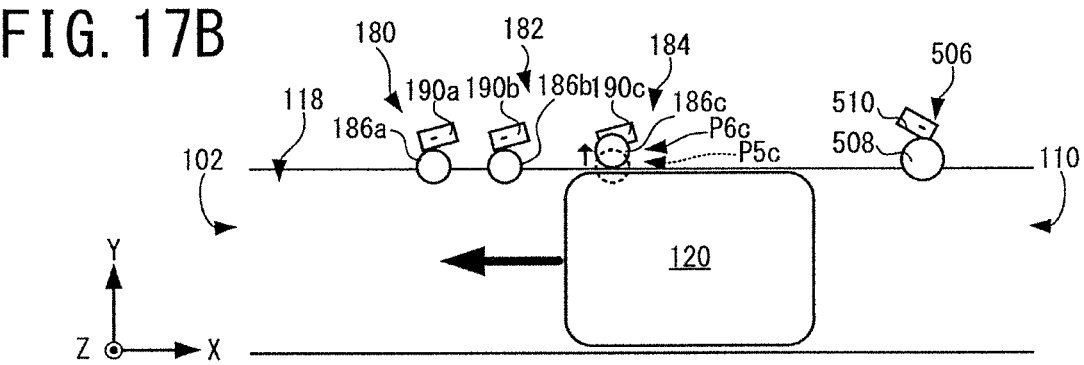
Figure 22:
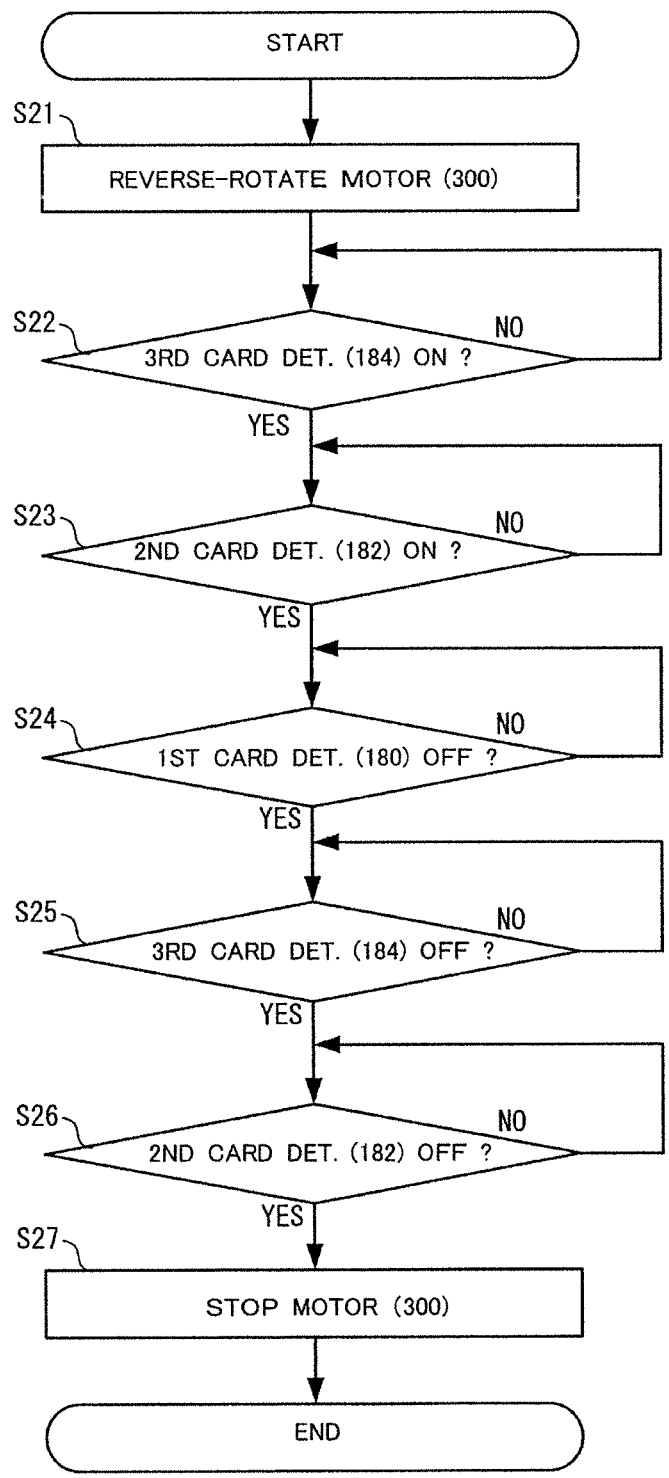
FIG. 22 is a flow chart showing the card conveying control of the card processing apparatus of FIG. 1, where the card is ejected from the apparatus.
Figure 23A:
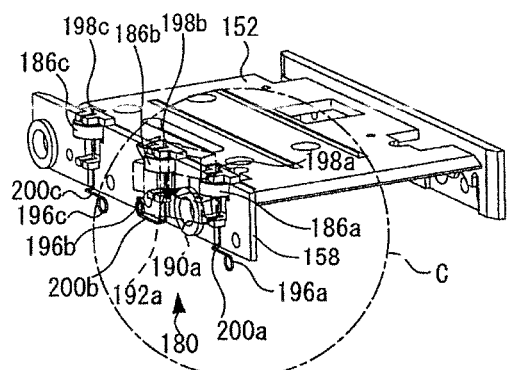
FIGS. 23A to 23D are diagrams showing the various states of the first card detector of the card processing apparatus of FIG. 1, respectively.
Figure 23B:
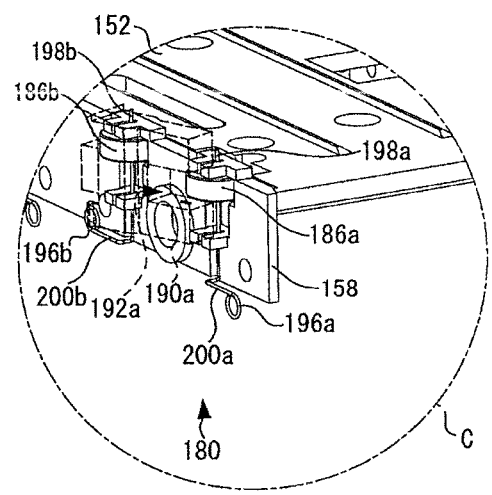
Figure 23C:
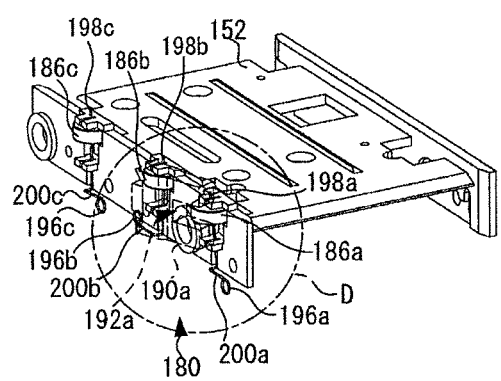
Figure 23D:
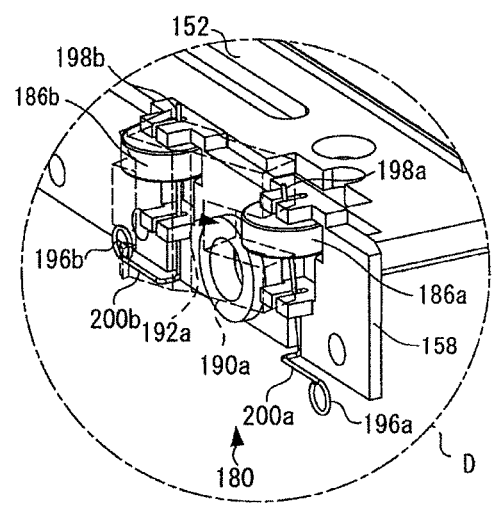

When the card 120 is conveyed forward to the third card detector 184, the third card detector 184 is turned to the ON state due to the pressing action by the card 120, as shown in FIG. 17B (Step S22 in FIG. 22). In this state, the third card detector 186 detects the card 120 and outputs a third detection signal SS3. The third detection signal SS3 is inputted into the control section 146. In other words, the third detection signal SS3 is a signal notifying that a card is detected.

Figure 17C:
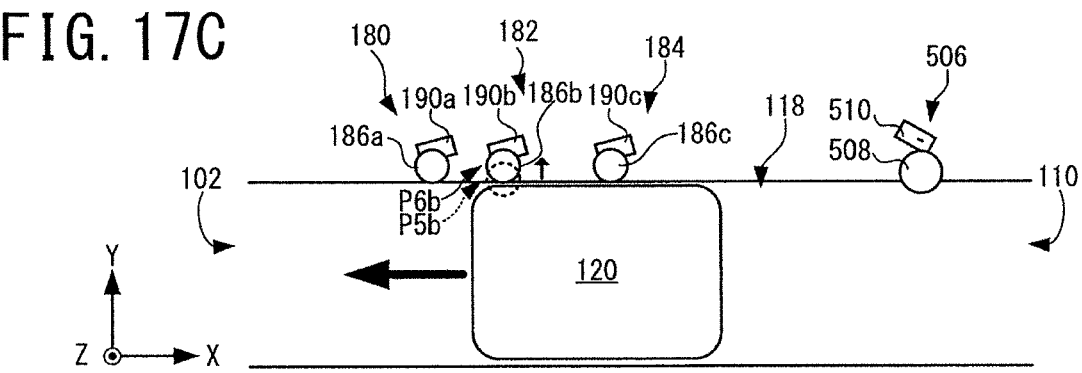

When the card 120 is conveyed forward to the second card detector 182, the second card detector 182 is turned to the ON state due to the pressing action by the card 120, as shown in FIG. 17C (Step S23 in FIG. 22). In this state, the second card detector 182 detects the card 120 and outputs a second detection signal SS2. At this time, the third card detector 184 keeps detecting the card 120 and therefore, the output of the third detection signal SS3 continues. At this stage, the second and third detection signals SS2 and SS3 are inputted into the control section 146. In other words, the second and third detection signals SS2 and SS3 are signals notifying that a card is detected.

Figure 17D:
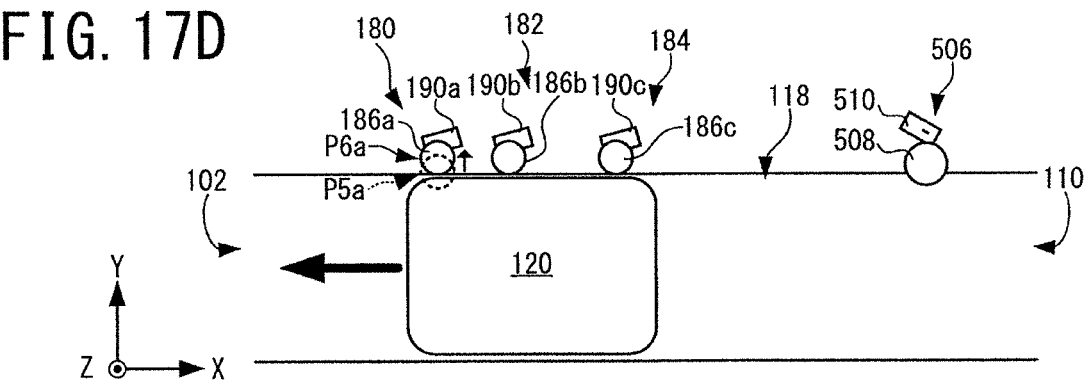
Figure 19:
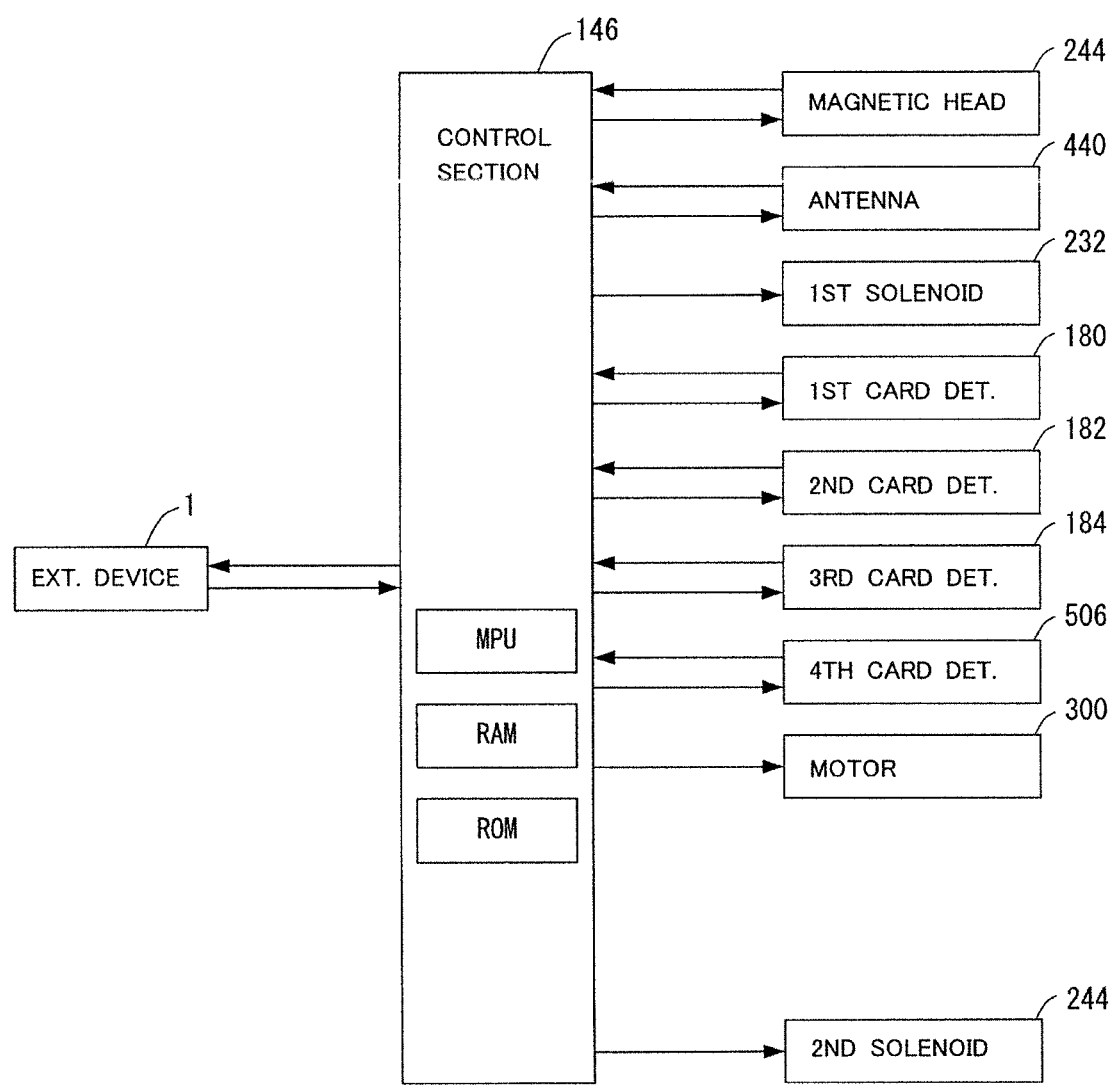
FIG. 19 is a functional block diagram of the card processing apparatus of FIG. 1.
Figure 20:
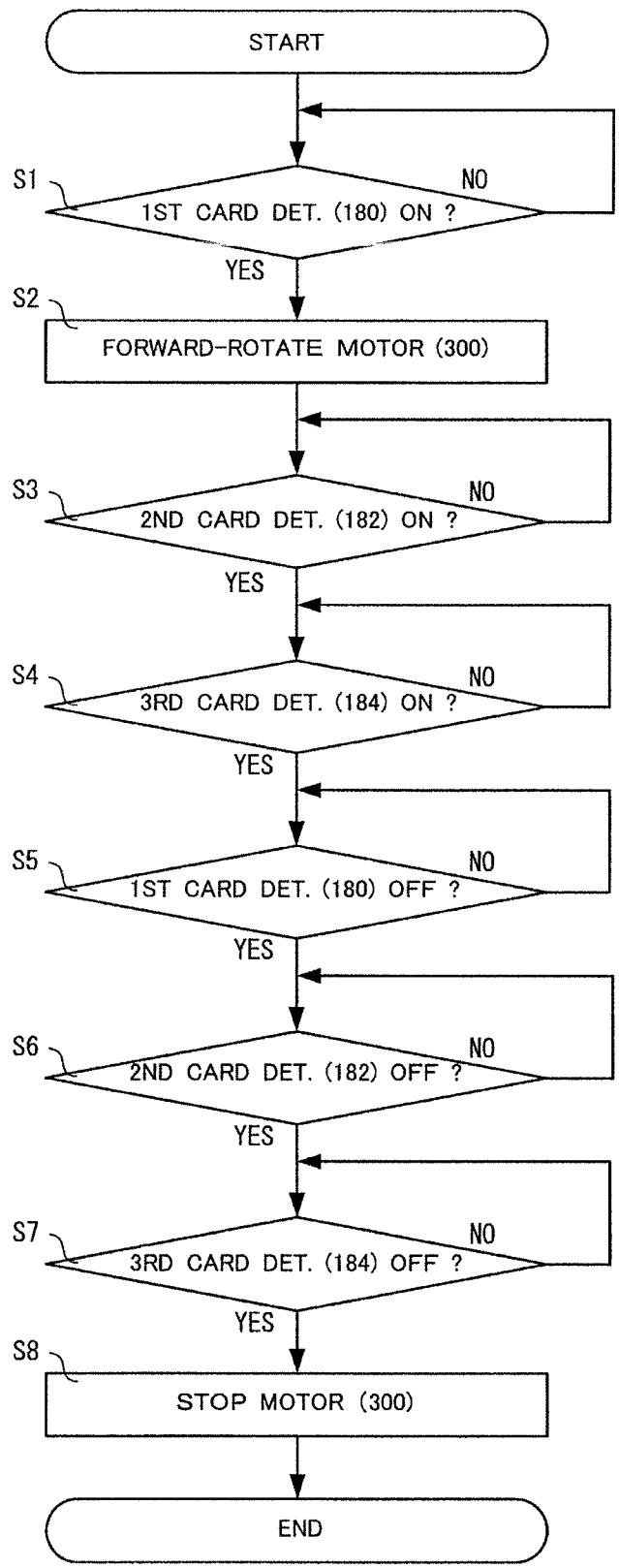
FIG. 20 is a flow chart showing the card conveying control of the card processing apparatus of FIG. 1, where the card is introduced into the apparatus through the first card insertion hole.

When the card 120 is conveyed forward to the first card detector 180, the first card detector 180 is turned to the ON state due to the pressing action by the card 120, as shown in FIG. 17D (Step S24 in FIG. 22). In this state, the first card detector 180 detects the card 120 and outputs a first detection signal SS1. At this time, the second and third card detectors 182 and 184 keep detecting the card 120 and therefore, the output of the second and third detection signals SS2 and SS3 continues. At this stage, the first, second, and third detection signals SS1, SS2, and SS3 are inputted into the control section 146. In other words, the first to third detection signals SS1, SS2, and SS3 are signals notifying that a card is detected.

When the card 120 is conveyed forward furthermore and the rear end of the card 120 is moved to a position which is shifted forward with respect to the third card detector 184, the third card detector 184 is shifted or returned to the OFF state due to release of the pressing action by the card 120, as shown in FIG. 18A (see Step S25 in FIG. 22). In this state, the third card detector 184 does not already detect the card 120 and the output of the third detection signal SS3 is stopped. At this time, the first and second card detectors 180 and 182 keep detecting the card 120 and thus, the output of the first and second detection signals SS1 and SS2 continues. At this stage, the input of the third detection signal SS3 into the control section 146 is stopped and the input of the first and second detection signals SS1 and SS2 into the control section 146 continues. In other words, the third detection signal SS3 is a signal notifying that a card is not detected and the first and second detection signals SS1 and SS2 are signals notifying that a card is detected.

When the card 120 is conveyed forward furthermore and the rear end of the card 120 is moved to a position which is shifted forward with respect to the second card detector 182, the second card detector 182 is shifted or returned to the OFF state due to release of the pressing action by the card 120, as shown in FIG. 18B (see Step S26 in FIG. 22). In this state, the second card detector 182 does not already detect the card 120 and the output of the second detection signal SS2 is stopped. At this time, the first card detector 180 is kept detecting the card 120 and thus, the output of the first detection signal SS1 continues. At this stage, the input of the second detection signal SS2 into the control section 146 is stopped and the input of the first detection signal SS1 into the control section 146 continues. In other words, the second and third detection signals SS2 and SS3 are signals notifying that a card is not detected and the first detection signal SS1 is a signal notifying that a card is detected.

If the inputs of the third and second detection signals SS3 and SS2 are stopped successively and as a result, the operation of the control section 146 is shifted from the full-detection state where all of the first to third detection signals SS1, SS2, and SS3 are inputted to the single-detection state where only the first detection signal SS1 is inputted, the control section 146 judges that the conveyance of the card 120 is completed, and stops the output of the second driving control signal DS2, thereby stopping the driving of the motor 300 (see Step S27 in FIG. 22). In this way, the ejecting process of the card 120 to the first card insertion hole 102a is completed.

In addition, if the card 120, which has already been ejected to the first card insertion hole 102a, is pulled out through the hole 102a, the input of the first detection signal SS1 also is stopped and therefore, the control section 146 judges that the card 120 has been pulled out from the hole 102a.

[Advantages of Card Processing Apparatus]

With the card processing apparatus 100 according to the first embodiment of the present invention, as explained above in detail, the first card detector 180 is provided at the first position in the conveying path 118, wherein the first position is adjacent to the first card insertion hole 102a, the second card detector 182 is provided at the second position in the conveying path 118, wherein the second position is apart from the first card detector 180 backward along the conveying path 118 at the predetermined distance, the third card detector 184 is provided at the third position in the conveying path 118, wherein the third position is apart from the second card detector 182 backward along the conveying path 118 at the predetermined distance. Based on the first, second, and third detection signals SS1, SS2, and SS3 which are respectively sent from the first, second, and third card detectors 180, 182, and 184, the conveying mechanism 112 for conveying an inserted card 120 forward or backward along the conveying path 118 is controlled by the control section 146.

Moreover, each of the first, second, and third card detectors 180, 182, and 184 comprises the roller 186a, 186b, or 186c (a movable operating member) which is moved from the standby position P5a, P5b, or P5c to the shifted position P6a, P6b, or P6c due to contact with a card 120 which is being conveyed on the conveying path 118, and the sensor 190a, 190b, or 190c for detecting a movement of the roller 186a, 186b, or 186c (the movable operating member) from the standby position P5a, P5b, or P5c to the shifted position P6a, P6b, or P6c. In response to which one of the first, second, and third detection signals SS1, SS2, and SS3 from the first, second, and third card detectors 180, 182, and 184 is a signal notifying that a card 120 is detected or a card 120 is not detected, notifying that a card is detected or a card is not detected, the control section 146 judges insertion or non-insertion of a card 120 through the first card insertion hole 102a and a position of a card 120 on the conveying path 118.

Accordingly, the insertion or non-insertion of a card 120 into the card processing apparatus 100 and the position of the inserted card 120 in the apparatus 100 can be surely detected regardless of whether a card 120 to be inserted has an opaque part (e.g., an information storage part) or not, and in the case where a card 120 to be inserted has an opaque part (e.g., an information storage part), regardless of the position of the opaque part in the card 120.

In addition, the restriction on the existence or non-existence of an opaque part (e.g., an information storage part) of a card 120 to be used for the card processing apparatus 100 and the restriction on the position of the opaque part in the card 120 can be eliminated.

Furthermore, the means for detecting the insertion or non-insertion of a card 120 into the card processing apparatus 100 and the means for detecting the position of the inserted card 120 in the apparatus 100 can be realized with a simple structure without causing any hindrance in conveyance of a card 120 and in processing to a card 120 (e.g., reading and writing processes of information).

Further in addition, the first, second, and third card detectors 180, 182, and 184 are respectively provided at the first, second, and third positions and each of the first, second, and third card detectors 180, 182, and 184 comprises the roller 186a, 186b, or 186c (the movable operating member) which is moved from the standby position P5a, P5b, or P5c to the shifted position P6a, P6b, or P6c due to contact with a card 120 which is being conveyed on the conveying path 118, and the sensor 190a, 190b, or 190c for detecting a movement of the roller 186a, 186b, or 186c from the standby position P5a, P5b, or P5c to the shifted position P6a, P6b, or P6c. Thus, the insertion or non-insertion of a card 120 into the card processing apparatus 100 and the position of the inserted card 120 in the apparatus 100 can be detected with a simple structure without causing any hindrance in conveyance of a card 120 and in processing to a card 120 (e.g., reading and writing processes of information).

Further in addition, with the apparatus 100 according to the first embodiment of the present invention, the fourth card detector 506 is additionally provided on the side close to the second card inserting slot 110a. The fourth card detector 506 comprises the roller 508 (an operating member) displaceable between the standby position P5d and the shifted position P6d due to contact with a card 120 which is being conveyed on the conveying path 118, and the sensor 510 for detecting the displacement of the roller 508 from the standby position P5d to the shifted position P6d. Thus, the card 120 which is inserted through the second card insertion hole 110a also can be conveyed on the conveying path 118.

Further in addition, with the first to fourth card detectors 180, 182, 184, and 506, it is configured that the displaced rollers 186a, 186b, 186c, and 508 by the card 120 block respectively the optical axes 194a, 194b, 194c, and 514 of the sensors 190a, 190b, 190c, and 510 to change the amounts of the light received by their light receivers, thereby detecting the card 120. In other words, the card 120 is indirectly detected by the sensors 190a, 190b, 190c, and/or 510 by way of the rollers 186a, 186b, 186c, and/or 508 of the first to fourth card detectors 180, 182, 184, and/or 506. For this reason, there is no need for changing the layout or arrangement of the first to fourth card detectors 180, 182, 184, and 506 in accordance with the type or kind of the card 120, that is, the existence or non-existence of an opaque part and/or the position of the opaque part in the card 120. Moreover, even if the card 120 is a skeleton card having transparency in its entirety, the card 120 can be detected by any of the first, second, third, and fourth card detectors 180, 182, 184, and 506. Furthermore, since the operating members which are pressed by the opposing edge of the card 120 are formed by the rollers 186a, 186b, 186c, and 508, the card 120 can be smoothly conveyed not only backward but also forward without any hindrance in conveyance of the card 120 which is caused by the first to fourth card detectors 180, 182, 184, and 506.

Second Embodiment

Figure 24A:
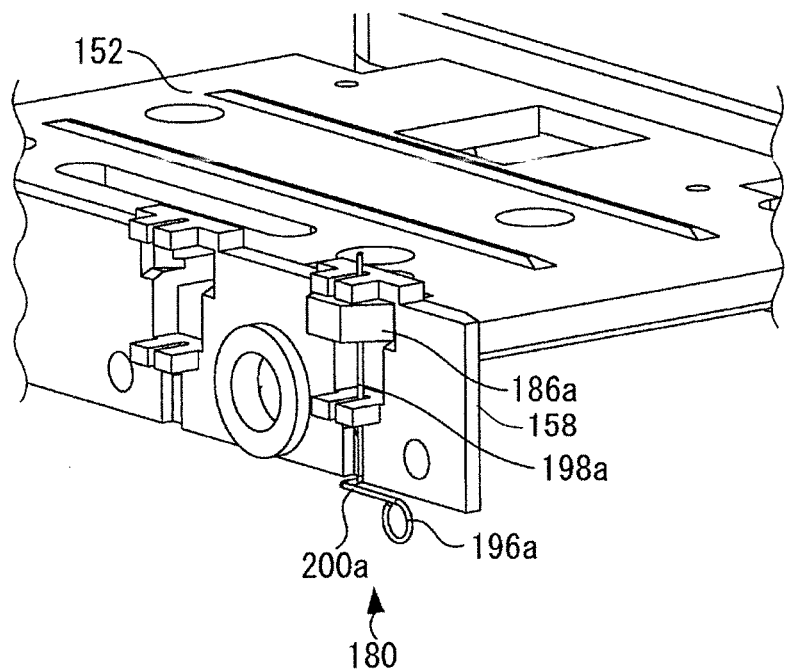
FIG. 24A is a partial perspective view showing the structure of a first card detector of a card processing apparatus according to a second embodiment of the present invention.
Figure 24B:
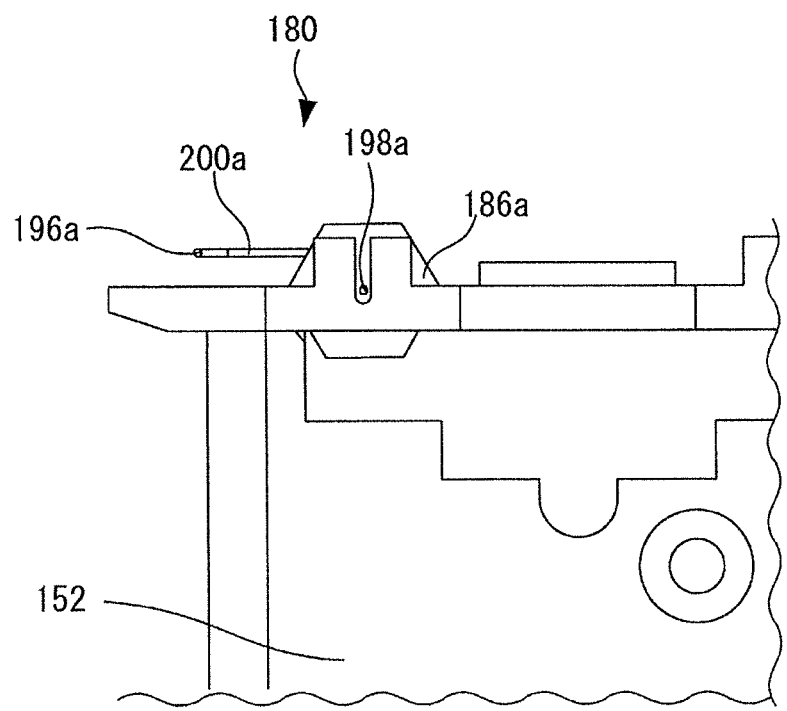
FIG. 24B is a side view thereof.

FIGS. 24A and 24B show the first card detector 180 of a card processing apparatus according to a second embodiment of the present invention. The card processing apparatus of the second embodiment has the same structure as the card processing apparatus 100 of the aforementioned first embodiment except that the roller 186a of the first card detector 180 does not have a circular plate-like or cylindrical shape but a hexagonal plate-like shape. The structure of the roller 186a and the other rollers 186b, 186c, and 508 can be changed to such the shape in the present invention.

Third Embodiment

Figure 25A:
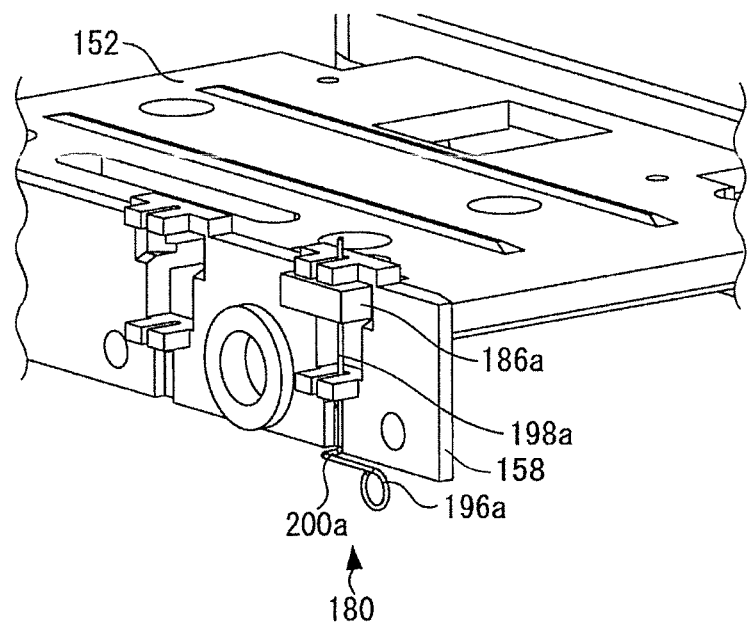
FIG. 25A is a partial perspective view showing the structure of a first card detector of a card processing apparatus according to a third embodiment of the present invention.
Figure 25B:
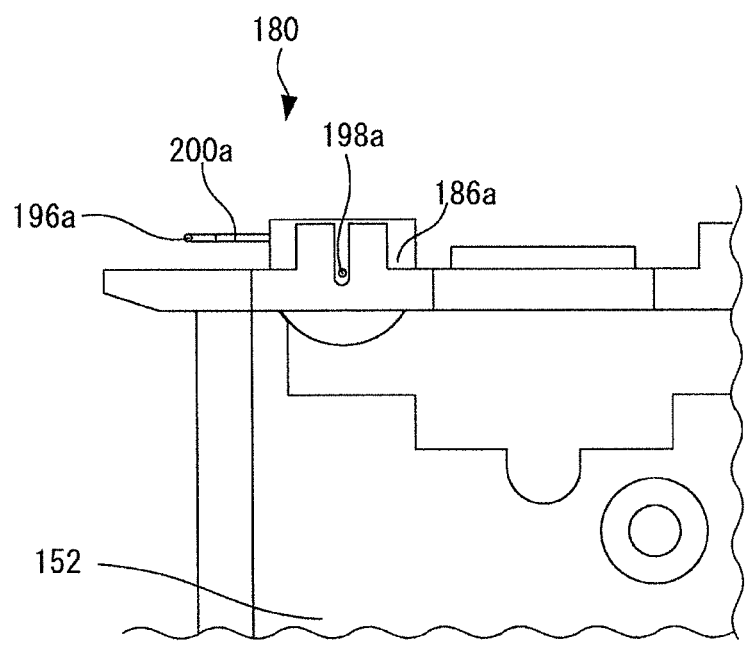
FIG. 25B is a side view thereof.

FIGS. 25A and 25B show the first card detector 180 of a card processing apparatus according to a third embodiment of the present invention. In this third embodiment, the roller 186a of the first card detector 180 has a shape formed by combining and unifying a semicircular plate-shaped inner part and a rectangular plate-shaped outer part. Except for this point, the card processing apparatus of the third embodiment has the same structure as the card processing apparatus 100 of the aforementioned first embodiment. The structure of the roller 186a and the other rollers 186b, 186c, and 508 can be changed in this way in the present invention.

Fourth Embodiment

Figure 26A:
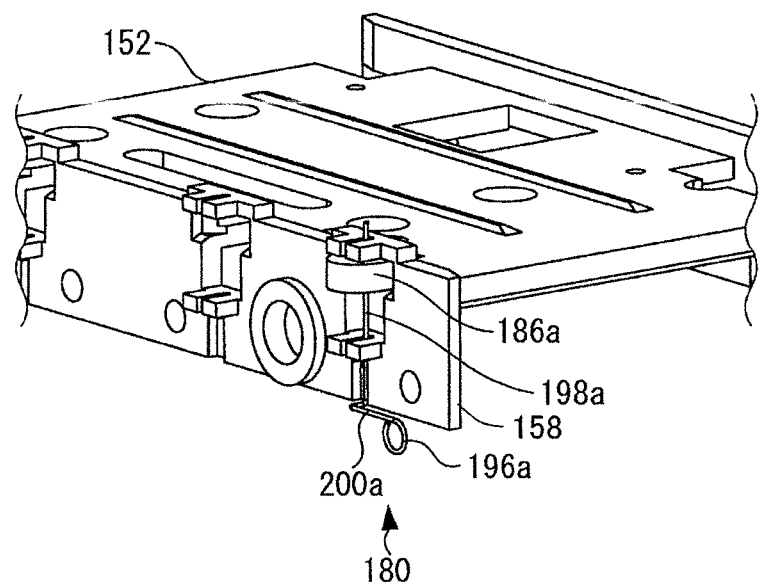
FIG. 26A is a partial perspective view showing the structure of a first card detector of a card processing apparatus according to a fourth embodiment of the present invention.
Figure 26B:
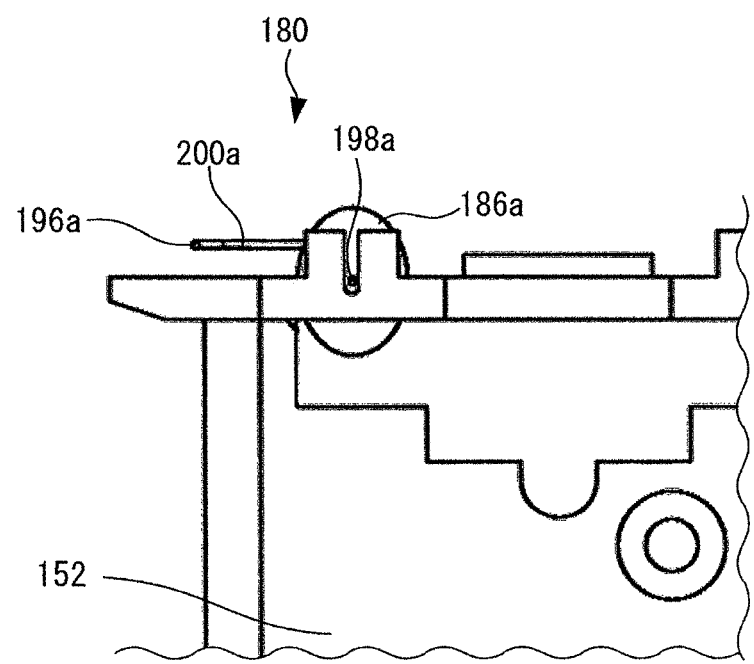
FIG. 26B is a side view thereof.

FIGS. 26A and 26B show the first card detector 180 of a card processing apparatus according to a fourth embodiment of the present invention. The card processing apparatus of the fourth embodiment has the same structure as the card processing apparatus 100 of the aforementioned first embodiment except that the roller 186a of the first card detector 180 does not have a circular plate-like or cylindrical shape but an ellipsoidal plate-like shape. The structure of the roller 186a and the other rollers 186b, 186c, and 508 can be changed to such the shape in the present invention.

VARIATIONS

The aforementioned first to fourth embodiments are embodied examples of the present invention. Therefore, it is needless to say that the present invention is not limited to the aforementioned embodiments and their variations and that any other modification is applicable to these embodiments and variations. For example, with the above-described first embodiment, any of the first to fourth card detectors 180, 182, 184, and 506 may be located on the side close to the first side plate 132.

The first to third card detectors 180, 182, and 184 may be arranged on the bottom surface 152 or the top surface of the first conveying path 150 and at the same time, the movable operating members (e.g., rollers) of these card detectors 180, 182, and 184 may be structured in such a way as to be displaceable to the outside of the first conveying path 150. In addition, the fourth card detector 506 may be located on the guide portion 502b of the second member 502 of the second card insertion section 110 or the guide portion 500b of the first member 500 thereof and at the same time, the movable operating member (e.g., a roller) of the card detector 506 may be structured in such a way as to be displaceable to the outside of the guide portion 502b or 500b. By this structure, even if a member or article which is smaller than the pair of short sides of a card 120 is inserted into the apparatus 100 through the first or second card insertion hole 102a or 110a, the back or surface of this member or article is inevitably contacted with any of the movable operating members (e.g., rollers) of the first to fourth card detectors 180, 182, 184, and 506. This means that the existence or non-existence of the above-described small member or article can be surely detected.

The first to third card detectors 180, 182, and 184 may be arranged on the bottom surface 152 or the top surface of the first conveying path 150 and at the same time, the movable operating members (e.g., rollers) of these card detectors 180, 182, and 184 may be structured in such a way as to be displaceable to the outside of the first conveying path 150. By this structure, even if a member or article which is smaller than the pair of short sides of a card 120 is inserted into the apparatus 100 through the first card insertion hole 102a, the back or surface of this member or article is inevitably contacted with any of the movable operating members of the first to third card detectors 180, 182, and 184. This means that the existence or non-existence of the above-described small member or article can be surely detected.

The first card detector 180 may be disposed on the bottom surface 152 or the top surface of the first conveying path 150 and at the same time, the movable operating member (e.g., a roller) of the card detector 180 may be structured in such a way as to be displaceable to the outside of the first conveying path 150. By this structure, even if a member or article which is smaller than the pair of short sides of a card 120 is inserted into the apparatus 100 through the first card insertion hole 102a, the back or surface of this member or article is inevitably contacted with the movable operating member of the first card detector 180. This means that the existence or non-existence of the above-described small member or article can be surely detected.

The fourth card detector 506 may be disposed on the guide portion 502b of the second member 502 of the second card insertion section 110 or the guide portion 500b of the first member 500 thereof and at the same time, the movable operating member (e.g., a roller) of the card detector 506 may be structured in such a way as to be displaceable to the outside of the guide portion 502b or 500b. By this structure, even if a member or article which is smaller than the pair of short sides of a card 120 is inserted into the apparatus 100 through the second card insertion hole 110a, the back or surface of this member or article is inevitably contacted with the movable operating member of the fourth card detector 506. This means that the existence or non-existence of the above-described small member or article can be surely detected.

In the aforementioned first and fourth embodiments, the first to fourth card detectors 180, 182, 184, and 506 are configured to include the rollers 186a, 186b, 186c, and 508 and the sensors 190a, 190b, 190c, and 510, respectively. However, the present invention is not limited to this. The rollers 186a, 186b, 186c, and 508 may be replaced with any other members such as ball bearing rollers. Moreover, the first to fourth card detectors 180, 182, 184, and 506 may be replaced with touch switches including ball plungers, or the like. These card detectors 180, 182, 184, and 506 may be replaced with any type of switches, such as micro switches and limit switches.

The present invention is not limited to the aforementioned first and fourth embodiments and their variations and includes a variety of other variations. For example, the magnetic head 244 and the contactless type antenna 440 are used in the aforementioned first embodiment, an IC contact probe of the contact type may be additionally provided. The magnetic head 244, the contactless type antenna 440, and an IC contact probe of the contact type may be selectively used. Moreover, all of the magnetic head 244, the contactless type antenna 440, and an IC contact probe of the contact type may be omitted, thereby limiting the performance of the coin processing apparatus 100 to the conveying and recovery functions of a card 120.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A card processing apparatus comprising:
a first card insertion section having a first card insertion hole;
a conveying section for conveying a card inserted through the first card insertion hole along a predetermined conveying path;
a conveying mechanism for conveying an inserted card forward or backward along the conveying path by driving the conveying section;
a first card detector provided at a first position in the conveying path, wherein the first position is adjacent to the first card insertion hole;
a second card detector provided at a second position in the conveying path, wherein the second position is apart from the first card detector backward along the conveying path at a predetermined distance;
a third card detector provided at a third position in the conveying path, wherein the third position is apart from the second card detector backward along the conveying path at a predetermined distance;
a control section for controlling the conveying mechanism based on a first detection signal sent from the first card detector, a second detection signal sent from the second card detector, and a third detection signal sent from the third card detector;
wherein each of the first card detector, the second card detector, and the third card detector comprises a movable operating member which is moved from a standby position to a shifted position due to contact with a card which is being conveyed on the conveying path, and a sensor for detecting a movement of the operating member from the standby position to the shifted position;
the standby position of the operating member is defined at a position where an inserted card which is being conveyed on the conveying path is contactable with the operating member at an opposing edge of the card, and the operating member is moved by the moving card toward outside of the conveying path to reach the shifted position;
the first, second, and third card detectors are respectively provided at the first, second, and third positions in such a way that the operating members in the first, second, and third card detectors can be simultaneously moved to the corresponding shifted positions by a card conveyed on the conveying path; and
the control section judges insertion or non-insertion of a card through the first card insertion hole and a position of a card on the conveying path based on a combination of which one of the first, second, and third detection signals is a signal notifying that a card is detected or a signal notifying that a card is not detected;
and wherein in each of the first, second, and third card detectors, the operating member comprises a resilient shaft having a first fixed end and a second displaceable end, and the operating member is attached to the second end of the shaft so as to be contactable to a card conveyed on the conveying path;
when a card conveyed on the conveying path is contacted with the operating member, the shaft is resiliently deformed to make a movement of the operating member to the shifted position from the standby position, wherein the movement of the operating member is detected by the sensor; and
the operating member is immediately returned to the standby position if the contact of the operating member with the card is released.

2. The card processing apparatus according to claim 1, wherein the conveying section comprises a pair of sidewalls provided respectively on two sides of the conveying path; and in each of the first, second, and third card detectors, the operating member is provided on one of the pair of sidewalls in such a way as to be retractably projected from the conveying path.

3. The card processing apparatus according to claim 1, wherein the operating member is rotatable or pivotable around the shaft.

4. The card processing apparatus according to claim 1, wherein when the first detection signal is a signal notifying that a card is detected and the second and third detection signals are signals notifying that a card is not detected, the control section judges that a card is inserted into the apparatus through the first card insertion hole, thereby conveying the card backward by driving the conveying mechanism.

5. The card processing apparatus according to claim 1, wherein when all of the first, second, and third detection signals are signals notifying that a card is not detected, the control section judges that a card inserted through the first card insertion hole is completely introduced into the apparatus, thereby stopping conveyance of the card by stopping the conveying mechanism.

6. The card processing apparatus according to claim 1, wherein when the control section detects successive changes of the third and second detection signals from signals notifying that a card is detected to signals notifying that a card is not detected, the control section judges that ejection of a card is instructed and stops the conveying mechanism to thereby stop conveyance of a card.

7. The card processing apparatus according to claim 1, further comprising:

a second card insertion section having a second card insertion hole, which is provided on the conveying path on an opposite side to the first card insertion hole; and a fourth card detector for sending a fourth detection signal, which is provided at a fourth position in the conveying path, wherein the fourth position is adjacent to the second card insertion hole;

wherein the fourth detector is provided at the fourth position in such a way that the operating members in the first, second, third, and fourth card detectors can be simultaneously kept at the corresponding standby positions when a card conveyed on the conveying path is located between the third and fourth card detectors; and when the fourth detection signal is a signal notifying a card is detected, the control section judges that a card is inserted through the second card insertion hole, thereby conveying the card forward by driving the conveying mechanism.

8. The card processing apparatus according to claim 1, wherein in each of the first, second, and third card detectors, the operating member is formed by a roller-shaped member which is supported by the resilient shaft; and the operating member is resiliently movable to the shifted position from the standby position due to contact with a card to provide a signal of the card's position in the card processing apparatus.

9. The card processing apparatus according to claim 1, wherein in each of the first, second, and third card detectors, the sensor is configured to detect optically a movement of the operating member due to contact with a card between the standby position and the shifted position; and when the operating member is displaced by contact with a card to the shifted position from the standby position, the sensor sends a corresponding one of the first, second, and third detection signals notifying that a card is detected.

10. The card processing apparatus according to claim 1, wherein in each of the first, second, and third card detectors, the sensor comprises a light emitter for emitting a light beam along a predetermined optical axis, and a light receiver for receiving the beam; and when the operating member is displaced by contact with a card to the shifted position from the standby position, the operating member blocks the optical axis of the light emitter and the sensor sends a corresponding one of the first, second, and third detection signals notifying that a card is detected.

11. The card processing apparatus according to claim 1, wherein when all of the first, second, and third detection signals from the first, second, and third card detectors are signals notifying that a card is not detected, the control section judges that an introducing process of a card introduced into the apparatus through the first card insertion hole is completed.

12. The card processing apparatus according to claim 7, wherein when the fourth detection signal from the fourth detector changes from a signal notifying that a card is detected to a signal notifying that a card is not detected and thereafter, the third detection signal from the third detector changes from a signal notifying that a card is detected to a signal notifying that a card is not detected, the control section judges that an introducing process of a card introduced into the apparatus through the second card insertion hole is completed.

13. The card processing apparatus according to claim 1, wherein when the third, second, and first detection signals from the third, second, and first detectors change successively from signals notifying that a card is not detected to signals notifying that a card is detected and thereafter, the third and second detection signals change successively from signals notifying that a card is detected to signals notifying that a card is not detected and the first detection signal is kept as a signal notifying that a card is detected, the control section judges that an ejecting process of a card introduced into the apparatus through the first or second card insertion hole is completed.

14. The card processing apparatus according to claim 1, wherein the movable operating member is configured to contact a side edge of an inserted card.

15. The card processing apparatus according to claim 1, wherein the movable operating member has a shape selected from a group consisting of a cylinder, a circular plate, a hexagonal plate, a semicircular plate, a rectangular plate and an ellipsoidal plate.

16. A card processing apparatus comprising:

a first card insertion section having a first card insertion hole;

a conveying section for conveying a card inserted through the first card insertion hole along a predetermined conveying path;

a conveying mechanism for conveying an inserted card forward or backward along the conveying path by driving the conveying section;

a first card detector provided at a first position in the conveying path, wherein the first position is adjacent to the first card insertion hole;

a second card detector provided at a second position in the conveying path, wherein the second position is apart from the first card detector and backward along the conveying path at a predetermined distance;

a third card detector provided at a third position in the conveying path, wherein the third position is apart from the second card detector and backward along the conveying path at a predetermined distance;

a control section for controlling the conveying mechanism based on a first detection signal sent from the first card detector, a second detection signal sent from the second card detector, and a third detection signal sent from the third card detector;

wherein each of the first card detector, the second card detector, and the third card detector comprises a movable operating member which is moved from a standby position to a shifted position due to contact with a side edge of an inserted card which is being conveyed on the conveying path, and a sensor for detecting a movement of the movable operating member from the standby position to the shifted position;

the standby position of the operating member is defined at a position where an inserted card which is being conveyed on the conveying path is contactable with the operating member at an opposing edge of the card, and the operating member is moved by the moving card toward outside of the conveying path to reach the shifted position;

the first, second, and third card detectors are respectively provided at the first, second, and third positions in such a way that the operating members in the first, second, and third card detectors can be simultaneously moved to the corresponding shifted positions by a card conveyed on the conveying path; and the control section judges insertion or non-insertion of a card through the first card insertion hole and a position of a card on the conveying path based on a combination of which one of the first, second, and third detection signals is a signal notifying that a card is detected or a signal notifying that a card is not detected;

and wherein in each of the first, second, and third card detectors, and inserted card which is being conveyed on the conveying path has a side edge contactable with the operating member;

the operating member is moved toward a shifted position on a side of the card and outside of the conveying path due to contact with the card to reach the shifted position;

the operating member is biased to immediately return to the standby position when the contact of the operating member with the side edge of the card is released;

the operating member includes a resilient shaft having a first fixed end and a send displaceable end;

the operating member is attached to the second end of the shaft so as to be contactable to the card conveyed on the conveying path; and when a card conveyed on the conveying path is contacted with the operating member, the resilient shaft is resiliently deformed to make a movement of the operating member to the shifted position from the standby position, wherein the movement of the operating member is detected by the sensor.

17. The card processing apparatus according to claim 7, wherein when the third detection signal is a signal notifying that a card is detected and the first and second detection signals are signals notifying that a card is not detected after the fourth detection signal is changed from a signal notifying that a card is detected to a signal notifying that a card is not detected, the control section judges that a card which is inserted into the apparatus through the second card insertion hole is conveyed to a data reading/writing section, thereby conveying the card backward by driving the conveying mechanism until the third detection signal is changed to a signal notifying that a card is not detected.

18. The card processing apparatus according to claim 1, wherein when the third detection signal is changed to a signal notifying that a card is not detected, the control section judges that conveyance of a card which is inserted into the apparatus through the second card insertion hole is completed, thereby stopping conveyance of the card by stopping the conveying mechanism.

\* \* \* \* \*